US012771566B2

(12) United States Patent
Zhao et al.

(10) Patent No.: US 12,771,566 B2
(45) Date of Patent: Oct. 20, 2026

(54) CONFERENCE CREATION METHOD, CONFERENCE CONTROL METHOD, AND ELECTRONIC DEVICE

(71) Applicant: HUAWEI TECHNOLOGIES CO., LTD., Shenzhen (CN)

(72) Inventors: Yiting Zhao, Hangzhou (CN); Ning Zhuang, Hangzhou (CN); Yuanyuan Xiao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 18/513,164

(22) Filed: Nov. 17, 2023

(65) Prior Publication Data

US 2024/0089134 A1 Mar. 14, 2024

Related U.S. Application Data

(63) Continuation of application No. PCT/CN2022/093635, filed on May 18, 2022.

(30) Foreign Application Priority Data

May 24, 2021 (CN) ......................... 202110567789.9

(51) Int. Cl.
*H04L 12/18* (2006.01)
*G06F 3/0482* (2013.01)

(52) U.S. Cl.
CPC ........ *H04L 12/1818* (2013.01); *G06F 3/0482* (2013.01)

(58) Field of Classification Search
CPC ............. H04L 12/1818; H04L 12/1822; H04L 12/1831; H04L 65/403; G06F 3/0482;
(Continued)

(56) References Cited

U.S. PATENT DOCUMENTS

2011/0072362 A1 3/2011 Denner et al.
2011/0271332 A1 * 11/2011 Jones .................. G06F 3/04883 715/753

(Continued)

FOREIGN PATENT DOCUMENTS

CN 109661676 A 4/2019
CN 111708596 A 9/2020

(Continued)

*Primary Examiner* — Yogeshkumar Patel

(74) *Attorney, Agent, or Firm* — WOMBLE BOND DICKINSON (US) LLP

(57) ABSTRACT

This application discloses a conference creation method, a conference control method, and an electronic device. In the method, in response to receiving an operation performed by a user in a first interface, a first electronic device enters a second interface. The second interface includes an input box for inputting information and a first control for creating a conference. The user inputs conference information in the input box of the second interface. A third interface is displayed in response to receiving an operation performed by the user on the first control in the second interface. The third interface includes an agenda arrangement list, the agenda arrangement list is generated based on time of the conference and a preset agenda template, and the agenda arrangement list of the conference includes at least one topic. The user may edit an agenda in the agenda arrangement list, for example, uploading a conference material.

17 Claims, 27 Drawing Sheets

(58) Field of Classification Search

CPC ............... G06F 3/04842; G06F 3/0486; G06F 3/04883; H04N 7/15; H04M 3/56; H04M 3/563; H04M 3/562; H04M 3/567; H04M 3/565; H04M 3/566

See application file for complete search history.

(56) References Cited

U.S. PATENT DOCUMENTS

| | | | | |
|---|---|---|---|---|
| 2016/0092578 | A1* | 3/2016 | Ganani | G06F 16/24575 707/728 |
| 2018/0039951 | A1* | 2/2018 | Wynn | H04N 21/4312 |
| 2018/0101281 | A1 | 4/2018 | Nelson et al. | |
| 2018/0101823 | A1* | 4/2018 | Nelson | H04N 7/155 |

FOREIGN PATENT DOCUMENTS

| | | | | |
|---|---|---|---|---|
| CN | 113542659 | A | | 10/2021 |
| JP | 2014143668 | A | * | 8/2014 |
| JP | 2019121093 | A | * | 7/2019 |

* cited by examiner

Conference system 100

CONFERENCE CREATION METHOD, CONFERENCE CONTROL METHOD, AND ELECTRONIC DEVICE

CROSS-REFERENCE TO RELATED APPLICATIONS

This application is a continuation of International Application No. PCT/CN2022/093635, filed on May 18, 2022, which claims priority to Chinese Patent Application No. 202110567789.9, filed on May 24, 2021. The disclosures of the aforementioned applications are hereby incorporated by reference in their entireties.

TECHNICAL FIELD

Embodiments of the present disclosure relate to the field of communications technologies, and in particular, to a conference creation method, a conference control method, and an electronic device.

BACKGROUND

At present, video conferencing also emphasizes organization and discipline, and gradually becomes a new form of formal conferencing. Because the formal conferencing has a strict conference agenda arrangement, time and topics are arranged and controlled when a video conference is created.

In an existing video conference creation method, a conference moderator usually determines a conference subject and conference time and collects information such as conference topics, conference materials, and participants in advance. The conference moderator determines durations, topic speakers, and a topic sequence of the conference topics, and selects specific time for the conference topics. The conference moderator logs in to a video conference creation system on an electronic device, and inputs the conference topics and information (for example, information such as the specific time of the topics and the topic speakers) one by one into the video conference creation system. The video conference creation system generates a video conference record based on the information input by the conference moderator, to complete video conference creation. It can be learned that, the existing video conference creation process includes a relatively large quantity of manual intervention operations, which takes a long time to create a conference.

SUMMARY

Embodiments of this application provide a conference creation method, a conference control method, and an electronic device, to quickly create a conference.

To achieve the foregoing objective, the following technical solutions are used in embodiments of this application.

According to a first aspect, an embodiment of this application provides a conference creation method. The method may be executed by an electronic device, or may be a component (for example, a chip, a chip system, or a processor) located in the electronic device. The following uses an example in which the method is executed by the electronic device for description. The method includes: displaying a first interface of a conferencing application, where the first interface is used to create a first conference; receiving first time of the first conference that is input by a user in the first interface, and receiving an operation of creating the first conference by the user; and displaying a second interface in response to receiving the operation of creating the first conference by the user. The second interface includes an agenda arrangement list of the first conference, the agenda arrangement list of the first conference is generated based on the first time of the first conference and a preset agenda template, and the agenda arrangement list of the first conference includes at least one topic.

The first interface may include an input box for inputting information and a first control for creating a conference. The input box of the first interface is used by the user to input conference information. The conference information includes a conference name, a start time, and an end time.

The agenda arrangement list may include at least one agenda, and the agenda may be understood as including a ritual and auxiliary activity (such as an opening, a rest, or an ending) and a topic during the conference. Therefore, the at least one agenda may include at least one topic.

One preset agenda template may correspond to one agenda type. The agenda type of the preset agenda template may be blank, and may be subsequently set by the user based on an actual situation. Alternatively, the agenda type may be a predefined type, for example, an opening, a topic, a rest, or an ending. Certainly, the agenda type may alternatively be a user-defined type, and the user-defined agenda type needs to be determined based on a type of a conference subject. For example, the type of the conference subject is a study type, and correspondingly, the agenda template may include a project, an exercise, question answering, and the like. The type of the conference subject is a notification/report type, and correspondingly, the agenda template may include a subject 1, a subject 2, . . . , a subject n, and the like. The type of the conference subject is an entertainment type, and correspondingly, the agenda template may include a dance, a song, a sketch, a comic dialogue, and the like. Certainly, other examples may also be included, which are not listed one by one herein.

In this way, in this embodiment of this application, the operation of creating the first conference by the user is received, the second interface is displayed, and the agenda arrangement list is displayed in the second interface, so that the agenda arrangement list is automatically generated. Subsequently, the user can create the conference by setting configuration information (such as an agenda template, a duration, a speaker, and a conference material) for each agenda. Therefore, in this embodiment of this application, a conference architecture is formed based on the conference information, and an agenda in the agenda arrangement list is edited and adjusted based on the formed conference architecture, thereby reducing conference creation operations and implementing quick conference creation.

In some implementations, before the agenda arrangement list of the first conference is generated based on the first time of the first conference and the preset agenda template, the method further includes: receiving content of the first conference that is input by the user in the first interface. The agenda arrangement list of the first conference is generated based on the first time of the first conference, the content of the first conference, and a preset correspondence between content and an agenda template.

In this way, in this embodiment of this application, the content of the first conference that is input by the user in the first interface is received, the operation of creating the first conference by the user is received, and the agenda arrangement list related to the conference content is displayed in the second interface, so that an agenda arrangement list that is much related to the conference content can be generated based on an actual situation, which is more flexible and practical.

In some implementations, the second interface further includes a first control, and the method further includes: displaying a third interface in response to receiving an operation performed by the user on the first control, where the third interface includes at least one second control and at least one agenda arrangement list, and each agenda arrangement list corresponds to one second control; and displaying, in the second interface in response to receiving an operation of selecting a target second control from the at least one second control by the user, an agenda arrangement list corresponding to the target second control as the agenda arrangement list of the first conference. In this way, in this embodiment of this application, the user can directly select an agenda arrangement list based on a requirement, so that the user requirement is met while the conference is quickly created.

In one embodiment, time of each agenda in the agenda arrangement list of the first conference is determined based on the first time of the first conference, an agenda template of the preset agenda template, and a correspondence between a preset agenda template and a preset duration.

In one embodiment, the first time includes at least one of a conference start time, a conference end time, and a conference duration.

In some implementations, the second interface further includes a third control, and the method further includes: requesting, in response to receiving an operation performed by the user on the third control, a server to share the second interface with another device. In this way, in this embodiment of this application, the server is requested to share the second interface with another device, so that a user of the another device can create the conference. For example, a speaker of each topic may create a topic for which the speaker is responsible, to jointly create the conference.

According to a second aspect, an embodiment of this application provides a conference creation method. The method may be executed by an electronic device, or may be a component (for example, a chip, a chip system, or a processor) located in the electronic device. The following uses an example in which the method is executed by the electronic device for description. The method includes: displaying a first interface of a conferencing application, where the first interface is used to create a first conference; receiving first time of the first conference that is input by a user in the first interface, and receiving an operation of creating the first conference by the user; displaying a second interface in response to receiving the operation of creating the first conference by the user, where the second interface includes at least one preset agenda template and an agenda arrangement area; and creating an agenda arrangement list of the first conference in the agenda arrangement area based on the first time of the first conference in response to receiving a first operation performed by the user on the preset agenda template.

In this way, in this embodiment of this application, the operation of creating the first conference by the user is received, the second interface is displayed, and the at least one preset agenda template and the agenda arrangement area are displayed in the second interface. The agenda arrangement list of the first conference is created in the agenda arrangement area based on the first time of the first conference in response to receiving the first operation performed by the user on the preset agenda template. For example, the user may drag a preset agenda template to the agenda arrangement area to generate an agenda, thereby completing creation of the agenda arrangement list. Subsequently, the user can create the conference by setting configuration information (such as an agenda template, a duration, a speaker, and a conference material) for each agenda. Therefore, in this embodiment of this application, a conference architecture is formed based on conference information, and an agenda in the agenda arrangement list is edited and adjusted based on the formed conference architecture, thereby reducing conference creation operations and implementing quick conference creation.

In one embodiment, the creating an agenda arrangement list of the first conference in the agenda arrangement area based on the first time of the first conference in response to receiving an operation performed by the user on the preset agenda template is specifically: displaying at least one identification box in the agenda arrangement area in response to receiving a first operation performed by the user on a first preset agenda template in the at least one preset agenda template; and displaying, in response to a second operation performed by the user on a first identification box in the at least one identification box, the first preset agenda template in the first identification box.

In one embodiment, the first operation includes a single-tap operation, a double-tap operation, a drag operation, a touch and hold operation, or a slide operation.

In one embodiment, the first operation includes the drag operation. The displaying, in response to a second operation performed by the user on a first identification box in the at least one identification box, the first preset agenda template in the first identification box is specifically: displaying the first preset agenda template in the first identification box when it is detected that the user drags the first preset agenda template to the first identification box.

In one embodiment, time of each agenda in the agenda arrangement list of the first conference is determined based on the time of the first conference, a preset agenda template corresponding to each agenda in the agenda arrangement list, and a correspondence between a preset agenda template and a preset duration.

In tone embodiment, the first time includes at least one of a conference start time, a conference end time, and a conference duration.

In some implementations, after the creating an agenda arrangement list of the first conference in the agenda arrangement area based on the first time of the first conference in response to receiving a first operation performed by the user on the preset agenda template, the method further includes: modifying configuration information of each agenda in the agenda arrangement list in response to receiving an operation performed by the user on each agenda in the agenda arrangement list of the first conference.

In one embodiment, the configuration information includes at least one of the following: a name, a material, a duration, a sequence number, and speaker information.

In some embodiments, the second interface further includes a first control, and the method further includes: displaying a third interface in response to receiving an operation performed by the user on the first control, where the third interface includes at least one second control and at least one agenda arrangement list, and each agenda arrangement list corresponds to one second control; and displaying, in the second interface in response to receiving an operation of selecting a target second control from the at least one second control by the user, an agenda arrangement list corresponding to the target second control as the agenda arrangement list of the first conference. In this way, in this embodiment of this application, the user can directly select an agenda arrangement list based on a requirement, so that the user requirement is met while the conference is quickly created.

In some embodiments, the second interface further includes a third control, and the method further includes: requesting, in response to receiving an operation performed by the user on the third control, a server to share the second interface with another device. In this way, in this embodiment of this application, the server is requested to share the second interface with another device, so that a user of the another device can create the conference. For example, a speaker of each topic may create a topic for which the speaker is responsible, to jointly create the conference.

According to a third aspect, an embodiment of this application provides a conference control method. The method may be executed by an electronic device, or may be a component (for example, a chip, a chip system, or a processor) located in the electronic device. The following uses an example in which the method is executed by the electronic device for description. The method includes: joining a first conference, where an agenda arrangement list of the first conference includes at least one agenda; displaying a first interface of a first agenda in the at least one agenda, where the first interface includes a progress axis of the first agenda, and the progress axis is used to represent an actual duration of the first agenda and a planned duration of the first agenda; and requesting a server to adjust the planned duration of the first agenda when the actual duration of the first agenda is not equal to the planned duration of the first agenda. In this way, in this embodiment of this application, time of each agenda can be adjusted in real time, and a conference tempo can be effectively controlled.

In one embodiment, the requesting a server to adjust the planned duration of the first agenda when the actual duration of the first agenda is not equal to the planned duration of the first agenda is specifically: uploading the actual duration of the first agenda to the server when the actual duration of the first agenda is not equal to the planned duration of the first agenda. The server is configured to assign the actual duration of the first agenda to the planned duration of the first agenda.

In one embodiment, the first interface further includes a first control for editing a duration, and the requesting a server to adjust the planned duration of the first agenda when the actual duration of the first agenda is not equal to the planned duration of the first agenda is specifically: displaying a second interface in response to receiving an operation performed by a user on the first control, where the second interface includes a duration modification box; receiving a first duration input by the user in the duration modification box; and uploading the first duration to the server. The server is further configured to assign the first duration to the planned duration of the first agenda, or the server is further configured to assign a sum of the first duration and an initial value of the planned duration of the first agenda to the planned duration of the first agenda.

In one embodiment, the requesting a server to adjust the planned duration of the first agenda when the actual duration of the first agenda is not equal to the planned duration of the first agenda is specifically: uploading a time difference between the actual duration of the first agenda and the planned duration of the first agenda to the server when the actual duration of the first agenda is not equal to the planned duration of the first agenda. When the time difference is a negative number, the server is configured to: determine a second agenda whose weight is greater than a first threshold, and assign a sum of a value of the time difference and an initial value of a planned duration of the second agenda to the planned duration of the second agenda. When the difference is a positive number, the server is configured to: determine a third agenda whose weight is less than the first threshold, and assign an initial value of a planned duration of the third agenda subtracted by a value of the time difference to the planned duration of the third agenda. In this way, in this embodiment of this application, conference time may be effectively allocated based on a real-time status, and more conference time is allocated to an agenda with a larger weight. That is, when an agenda has time remaining during the conference, the remaining time is preferentially allocated to an agenda with a high priority. Similarly, when an agenda lacks time during the conference, time may be taken from an agenda with a lower priority (for example, time of a rest is occupied).

In one embodiment, a quantity of the at least one agenda is n, and n is a positive integer greater than or equal to 2. The requesting a server to adjust the planned duration of the first agenda when the actual duration of the first agenda is not equal to the planned duration of the first agenda is specifically: when the actual duration of the first agenda is not equal to the planned duration of the first agenda, performing an operation of keeping time of the last agenda in the n agendas unchanged.

In some embodiments, the progress axis of the first agenda includes a first segment and a second segment, the first segment is used to represent the planned duration of the first agenda or the actual duration of the first agenda, and the second segment is used to represent the time difference between the planned duration of the first agenda and the actual duration of the first agenda. The method further includes: when the actual duration of the first agenda is not equal to the planned duration of the first agenda, displaying the first segment and the second segment of the progress axis of the first agenda in a differentiated manner. In this way, in this embodiment of this application, a participant and a speaker can be effectively reminded of progress of each agenda.

In some embodiments, the first interface further includes a second control for switching between agendas, and the method further includes: displaying a second interface of the second agenda of the first conference in response to receiving an operation performed by the user on the second control. The second interface includes a progress axis of the second agenda, and the progress axis is used to represent an actual duration of the second agenda and the planned duration of the second agenda.

In some embodiments, the progress axis of the second agenda includes a first segment and a second segment, the first segment is used to represent the time difference between the planned duration of the first agenda and the actual duration of the first agenda, and the second segment is used to represent the planned duration of the second agenda. The method further includes: when the actual duration of the first agenda is not equal to the planned duration of the first agenda, displaying the first segment and the second segment of the progress axis of the second agenda in a differentiated manner. In this way, in this embodiment of this application, a participant and a speaker can be effectively reminded of progress of each agenda.

In some embodiments, the first interface further includes an exhibition area and a file-associated area, and the file-associated area includes a first file. The method further includes: in response to receiving an operation performed by the user on the first file, moving the first file from the file-associated area to the exhibition area for display. In this way, in this embodiment of this application, a speaker may quickly move a file from the file-associated area to the exhibition area, so that participants can view and browse the file.

According to a fourth aspect, an embodiment of this application provides an electronic device. The electronic device includes: a first display unit, configured to display a first interface of a conferencing application, where the first interface is used to create a first conference; a first receiving unit, configured to receive first time of the first conference that is input by a user in the first interface, and receive an operation of creating the first conference by the user; and a second display unit, configured to display a second interface in response to receiving the operation of creating the first conference by the user. The second interface includes an agenda arrangement list of the first conference, the agenda arrangement list of the first conference is generated based on the first time of the first conference and a preset agenda template, and the agenda arrangement list of the first conference includes at least one topic.

In some embodiments, the electronic device further includes: a second receiving unit, configured to receive content of the first conference that is input by the user in the first interface. The agenda arrangement list of the first conference is generated based on the first time of the first conference, the content of the first conference, and a preset correspondence between content and an agenda template.

In some embodiments, the second interface further includes a first control, and the electronic device further includes: a third display unit, configured to display a third interface in response to receiving an operation performed by the user on the first control, where the third interface includes at least one second control and at least one agenda arrangement list, and each agenda arrangement list corresponds to one second control; and a fourth display unit, configured to display, in the second interface in response to receiving an operation of selecting a target second control from the at least one second control by the user, an agenda arrangement list corresponding to the target second control as the agenda arrangement list of the first conference.

In one embodiment, time of each agenda in the agenda arrangement list of the first conference is determined based on the first time of the first conference, an agenda template of the preset agenda template, and a correspondence between a preset agenda template and a preset duration.

In one embodiment, the first time includes at least one of a conference start time, a conference end time, and a conference duration.

In some embodiments, the second interface further includes a third control, and the electronic device further includes: a sending unit, configured to request, in response to receiving an operation performed by the user on the third control, a server to share the second interface with another device.

According to a fifth aspect, an embodiment of this application provides an electronic device. The electronic device includes: a first display unit, configured to display a first interface of a conferencing application, where the first interface is used to create a first conference; a receiving unit, configured to receive first time of the first conference that is input by a user in the first interface, and receive an operation of creating the first conference by the user; a second display unit, configured to display a second interface in response to receiving the operation of creating the first conference by the user, where the second interface includes at least one preset agenda template and an agenda arrangement area; and a creation unit, configured to create an agenda arrangement list of the first conference in the agenda arrangement area based on the first time of the first conference in response to receiving a first operation performed by the user on the preset agenda template.

In one embodiment, the creation unit is further configured to: display at least one identification box in the agenda arrangement area in response to receiving a first operation performed by the user on a first preset agenda template in the at least one preset agenda template; and display, in response to a second operation performed by the user on a first identification box in the at least one identification box, the first preset agenda template in the first identification box.

In one embodiment, the first operation includes a single-tap operation, a double-tap operation, a drag operation, a touch and hold operation, or a slide operation.

In one embodiment, the first operation includes the drag operation. The creation unit is further configured to display the first preset agenda template in the first identification box when it is detected that the user drags the first preset agenda template to the first identification box.

In one embodiment, time of each agenda in the agenda arrangement list of the first conference is determined based on the time of the first conference, a preset agenda template corresponding to each agenda in the agenda arrangement list, and a correspondence between a preset agenda template and a preset duration.

In one embodiment, the first time includes at least one of a conference start time, a conference end time, and a conference duration.

In some embodiments, the electronic device further includes: a modification unit, configured to modify configuration information of each agenda in the agenda arrangement list in response to receiving an operation performed by the user on each agenda in the agenda arrangement list of the first conference.

In one embodiment, the configuration information includes at least one of the following: a name, a material, a duration, a sequence number, and speaker information.

In some embodiments, the second interface further includes a first control, and the electronic device further includes: a third display unit, configured to display a third interface in response to receiving an operation performed by the user on the first control, where the third interface includes at least one second control and at least one agenda arrangement list, and each agenda arrangement list corresponds to one second control; and a fourth display unit, configured to display, in the second interface in response to receiving an operation of selecting a target second control from the at least one second control by the user, an agenda arrangement list corresponding to the target second control as the agenda arrangement list of the first conference.

In some embodiments, the second interface further includes a third control, and the electronic device further includes: a sending unit, configured to request, in response to receiving an operation performed by the user on the third control, a server to share the second interface with another device.

According to a sixth aspect, an embodiment of this application provides an electronic device. The electronic device includes: a join unit, configured to join a first conference, where an agenda arrangement list of the first conference includes at least one agenda; a first display unit, configured to display a first interface of a first agenda in the at least one agenda, where the first interface includes a progress axis of the first agenda, and the progress axis is used to represent an actual duration of the first agenda and a planned duration of the first agenda; and an adjustment unit, configured to request a server to adjust the planned duration of the first agenda when the actual duration of the first agenda is not equal to the planned duration of the first agenda.

In one embodiment, the adjustment unit is further configured to upload the actual duration of the first agenda to the server when the actual duration of the first agenda is not equal to the planned duration of the first agenda. The server is configured to assign the actual duration of the first agenda to the planned duration of the first agenda.

In one embodiment, the adjustment unit is further configured to: display a second interface in response to receiving an operation performed by a user on a first control, where the second interface includes a duration modification box; receive a first duration input by the user in the duration modification box; and upload the first duration to the server. The server is further configured to assign the first duration to the planned duration of the first agenda, or the server is further configured to assign a sum of the first duration and an initial value of the planned duration of the first agenda to the planned duration of the first agenda.

In one embodiment, the adjustment unit is further configured to upload a time difference between the actual duration of the first agenda and the planned duration of the first agenda to the server when the actual duration of the first agenda is not equal to the planned duration of the first agenda. When the time difference is a negative number, the server is configured to: determine a second agenda whose weight is greater than a first threshold, and assign a sum of a value of the time difference and an initial value of a planned duration of the second agenda to the planned duration of the second agenda. When the difference is a positive number, the server is configured to: determine a third agenda whose weight is less than the first threshold, and assign an initial value of a planned duration of the third agenda subtracted by a value of the time difference to the planned duration of the third agenda.

In one embodiment, a quantity of the at least one agenda is n, and n is a positive integer greater than or equal to 2. The adjustment unit is further configured to: when the actual duration of the first agenda is not equal to the planned duration of the first agenda, perform an operation of keeping time of the last agenda in the n agendas unchanged.

In some embodiments, the progress axis of the first agenda includes a first segment and a second segment, the first segment is used to represent the planned duration of the first agenda or the actual duration of the first agenda, and the second segment is used to represent the time difference between the planned duration of the first agenda and the actual duration of the first agenda. The electronic device further includes: a second display unit, configured to: when the actual duration of the first agenda is not equal to the planned duration of the first agenda, display the first segment and the second segment of the progress axis of the first agenda in a differentiated manner.

In some embodiments, the first interface further includes a second control for switching between agendas, and the electronic device further includes a third display unit, configured to display a second interface of the second agenda of the first conference in response to receiving an operation performed by the user on the second control. The second interface includes a progress axis of the second agenda, and the progress axis is used to represent an actual duration of the second agenda and the planned duration of the second agenda.

In some embodiments, the progress axis of the second agenda includes a first segment and a second segment, the first segment is used to represent the time difference between the planned duration of the first agenda and the actual duration of the first agenda, and the second segment is used to represent the planned duration of the second agenda. The electronic device further includes: a fourth display unit, configured to: when the actual duration of the first agenda is not equal to the planned duration of the first agenda, display the first segment and the second segment of the progress axis of the second agenda in a differentiated manner.

In some embodiments, the first interface further includes an exhibition area and a file-associated area, and the file-associated area includes a first file. The electronic device further includes: a fifth display unit, configured to: in response to receiving an operation performed by the user on the first file, move the first file from the file-associated area to the exhibition area for display.

According to a seventh aspect, a computer-readable storage medium is provided. The computer-readable storage medium includes computer instructions, and when the computer instructions are run on an electronic device, the electronic device is enabled to execute the conference creation method in the first aspect, or the conference creation method in the second aspect, or the conference control method in the third aspect.

According to an eighth aspect, a computer program is provided. When the program is invoked by a processor, the conference creation method in the first aspect is executed, or the conference creation method in the second aspect is executed, or the conference control method in the second aspect is executed.

According to a ninth aspect, a chip system is provided, including one or more processors. When the one or more processors execute instructions, the one or more processors execute the conference creation method in the first aspect, or the conference creation method in the second aspect, or the conference control method in the third aspect.

For embodiments and corresponding technical effects of embodiments in the fourth aspect to the ninth aspect, refer to the embodiments and the technical effects of the first aspect, the second aspect, and the third aspect.

BRIEF DESCRIPTION OF DRAWINGS

To describe technical solutions in embodiments of this application more clearly, the following briefly describes accompanying drawings used in describing embodiments. It is clear that the accompanying drawings in the following description show merely some embodiments of this application, and a person of ordinary skill in the art may still derive other drawings from these accompanying drawings without creative efforts.

Figure 4:
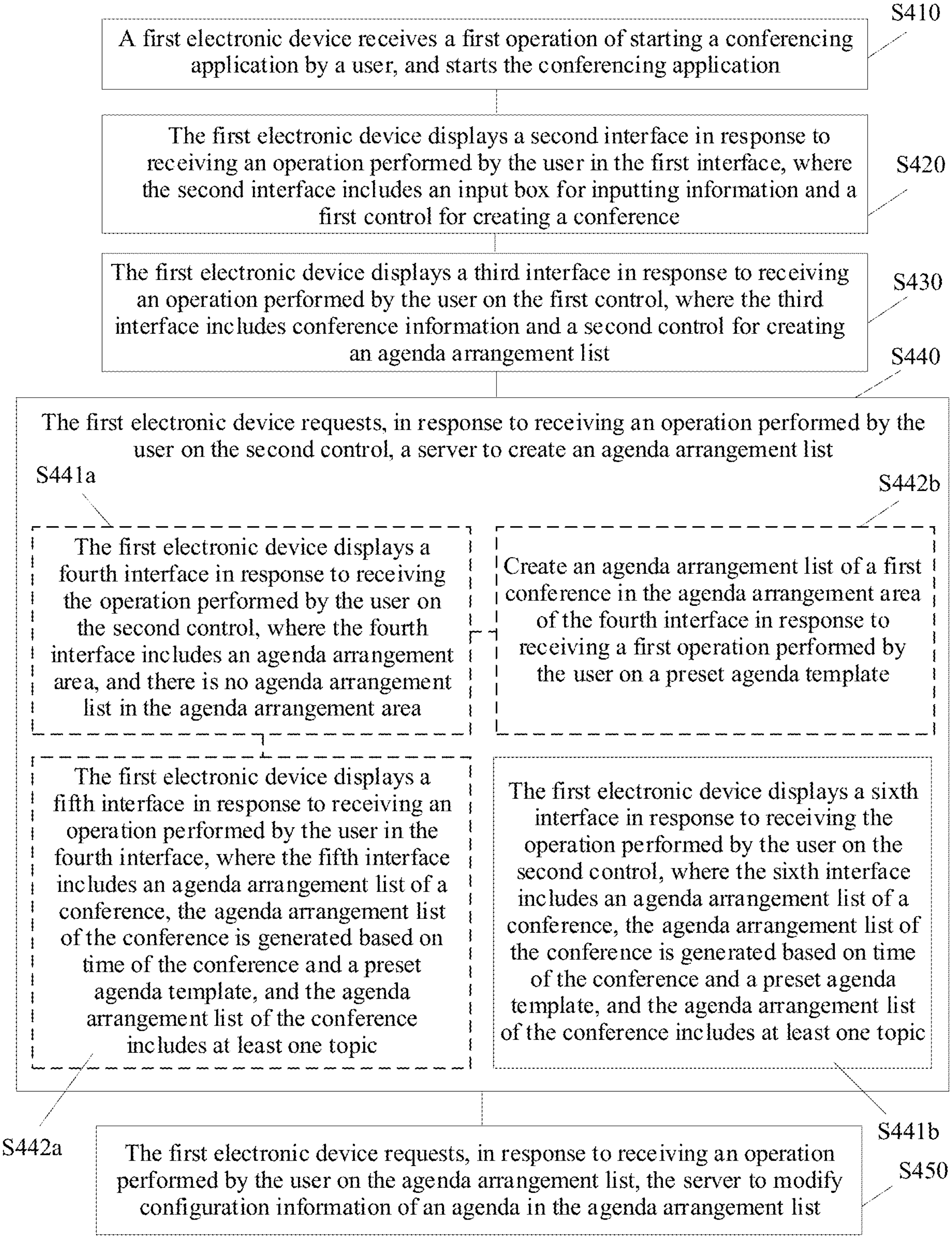
FIG. 4 is a schematic flowchart of a conference creation method according to an embodiment of this application.
Figure 4A:
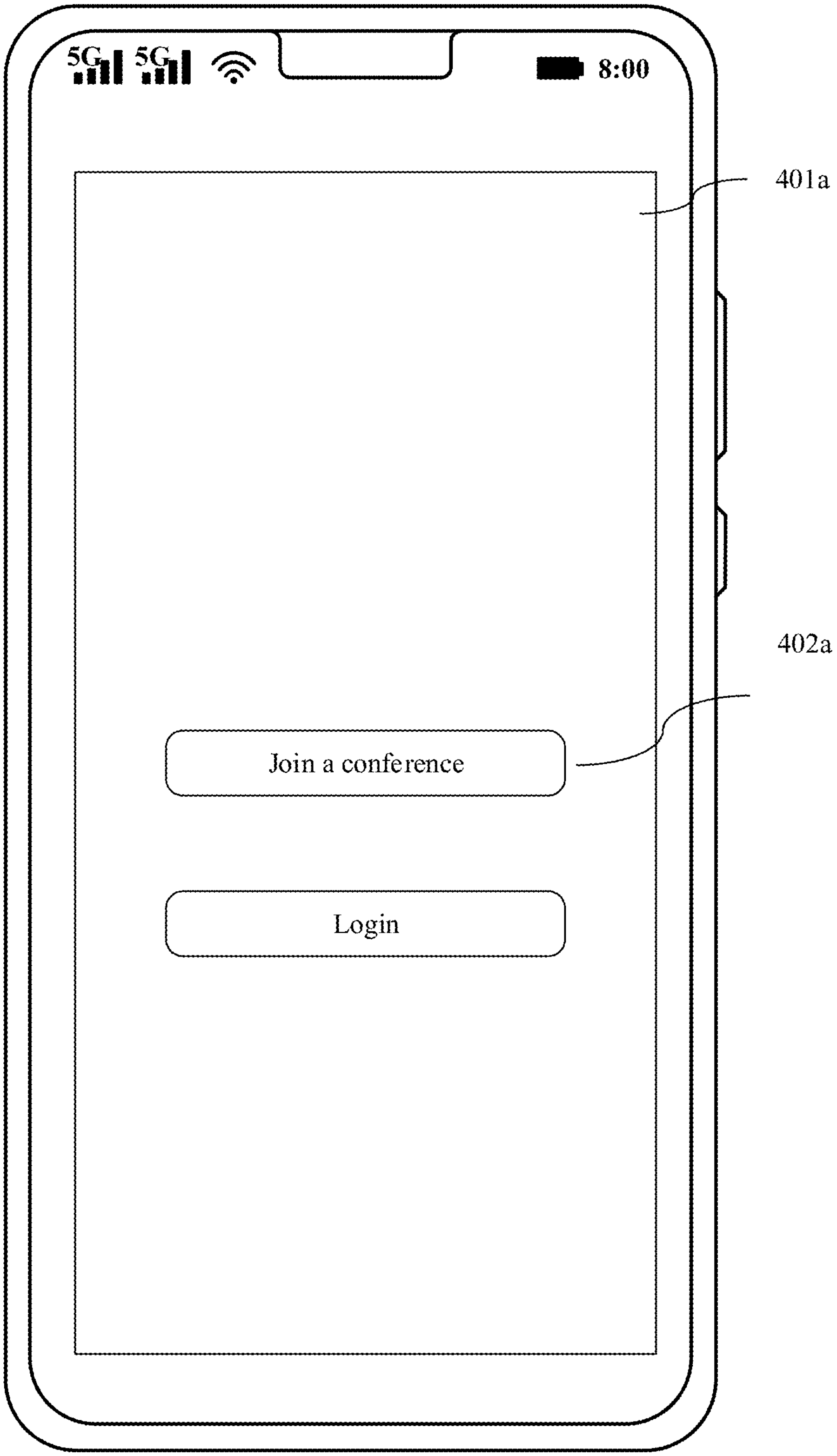
Figure 4B:
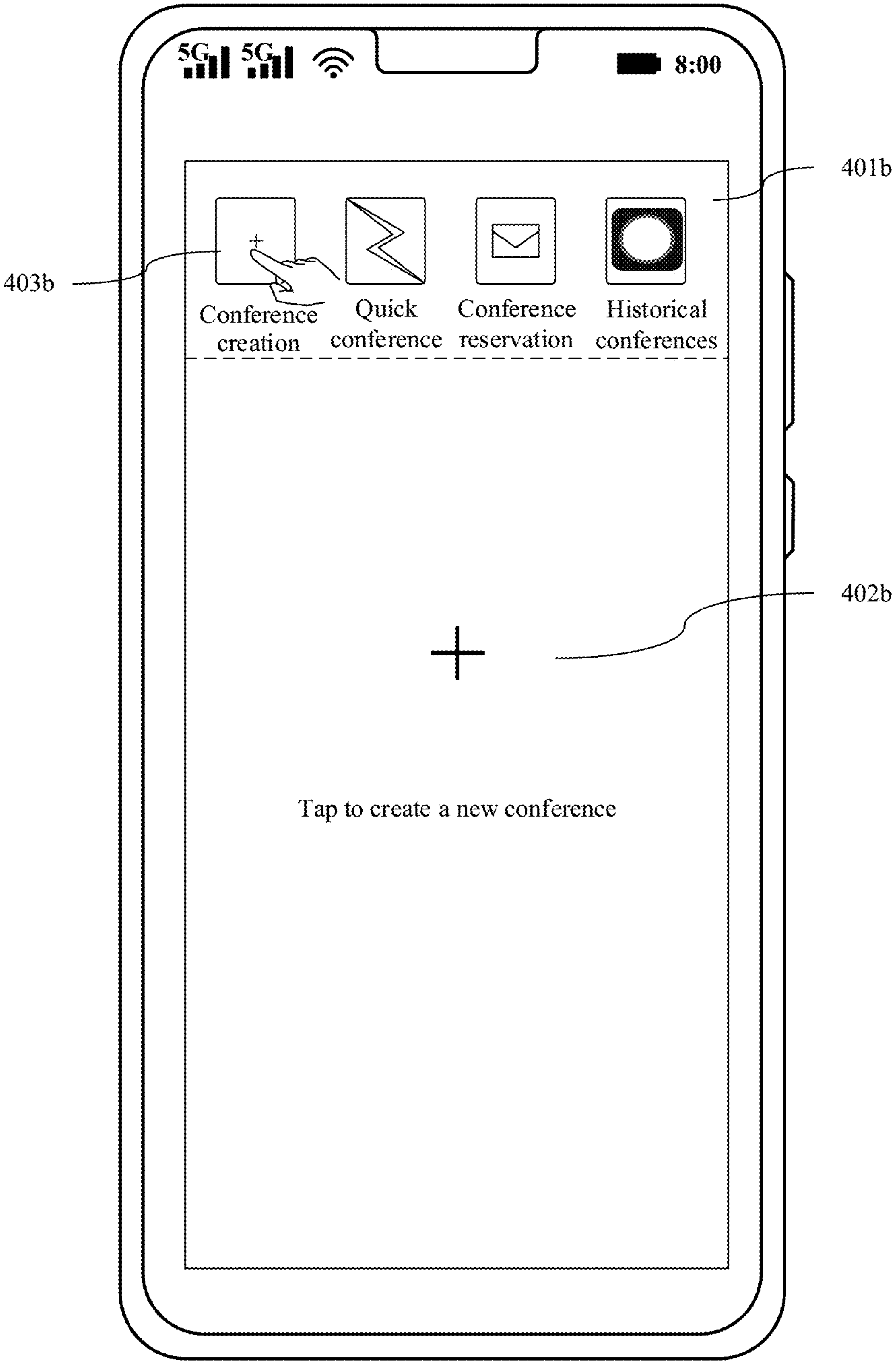
Figure 5:
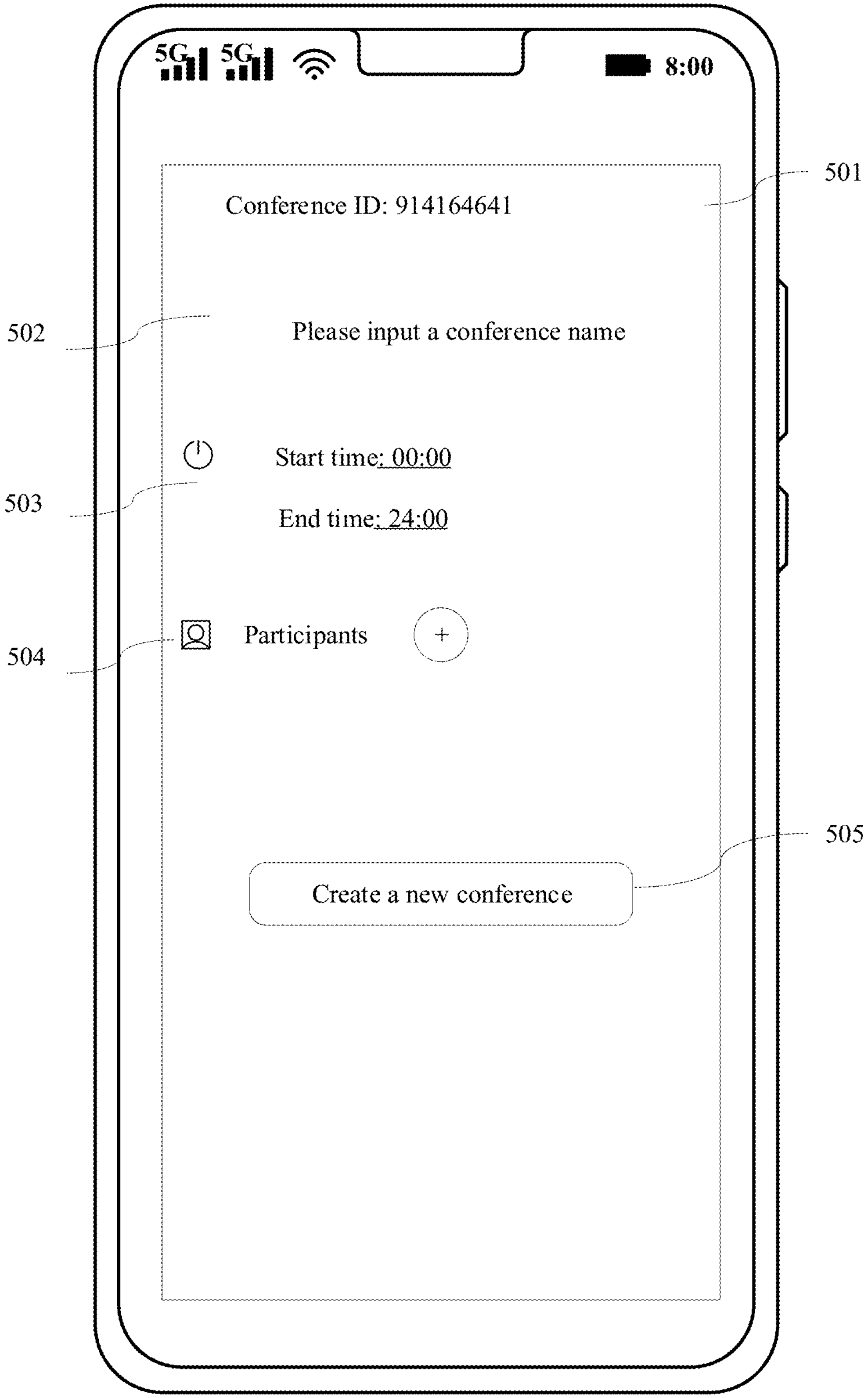
Figure 6:
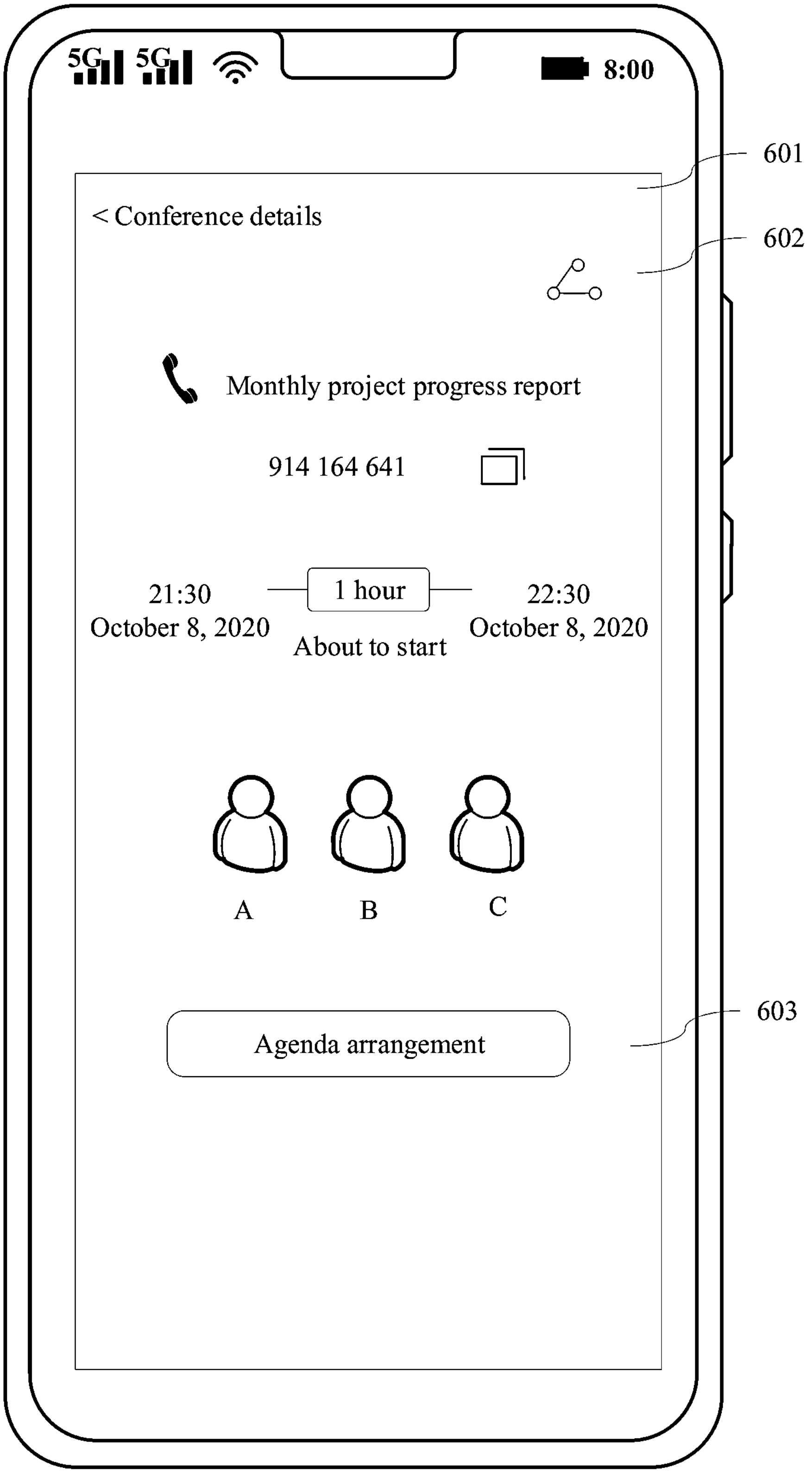
Figure 7A:
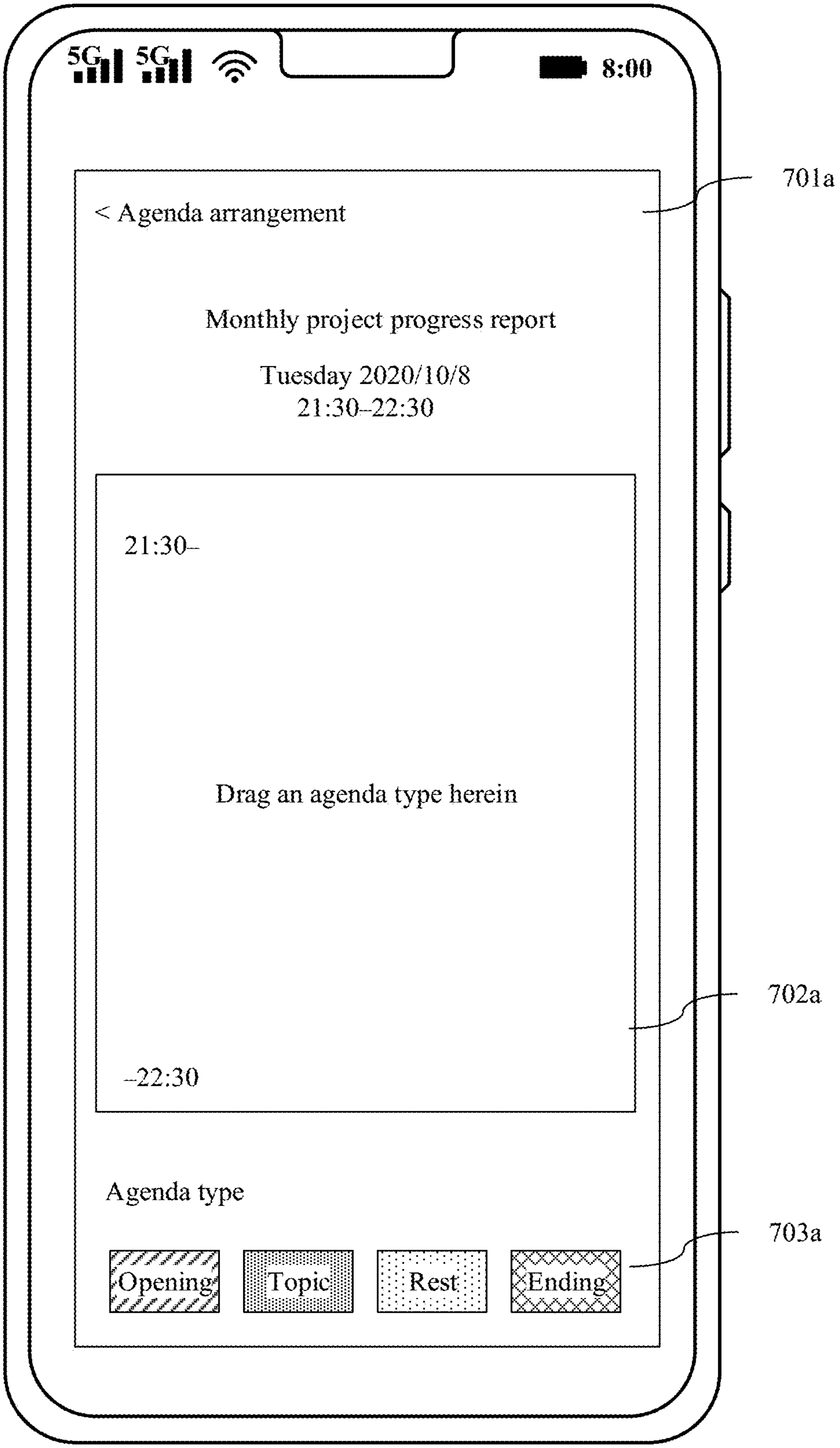
Figure 7B:
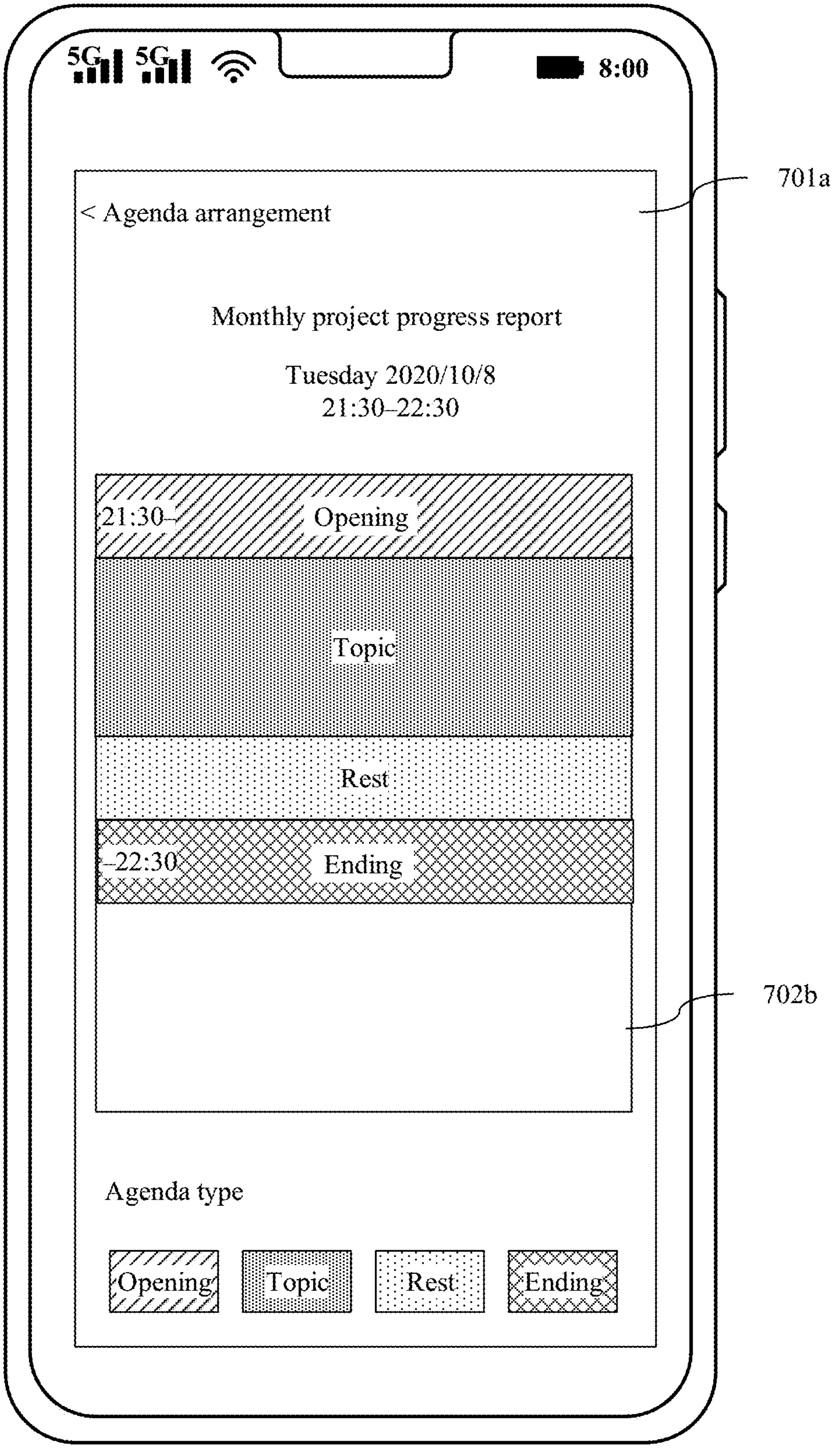
Figure 7C:
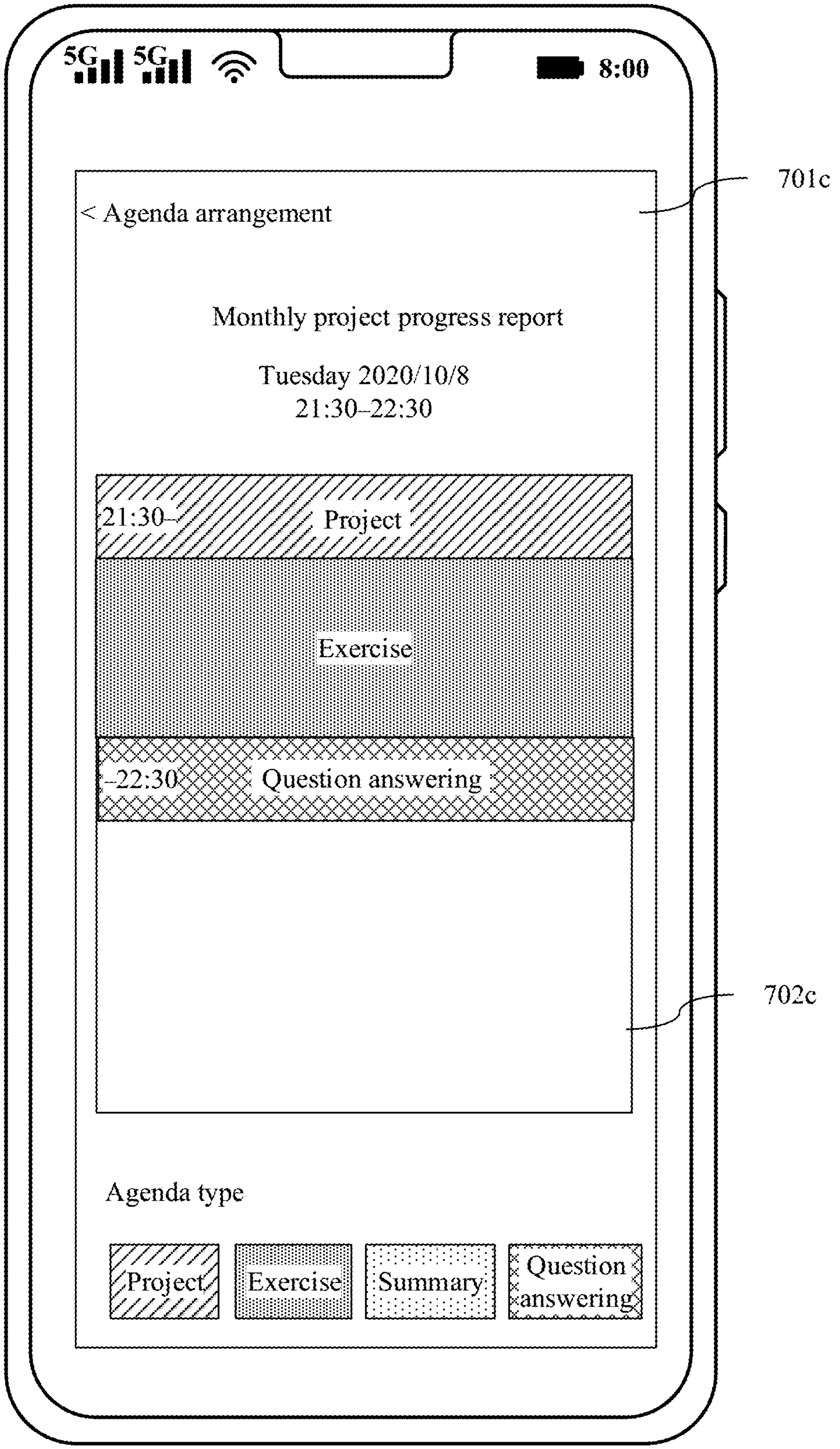
Figure 7D:
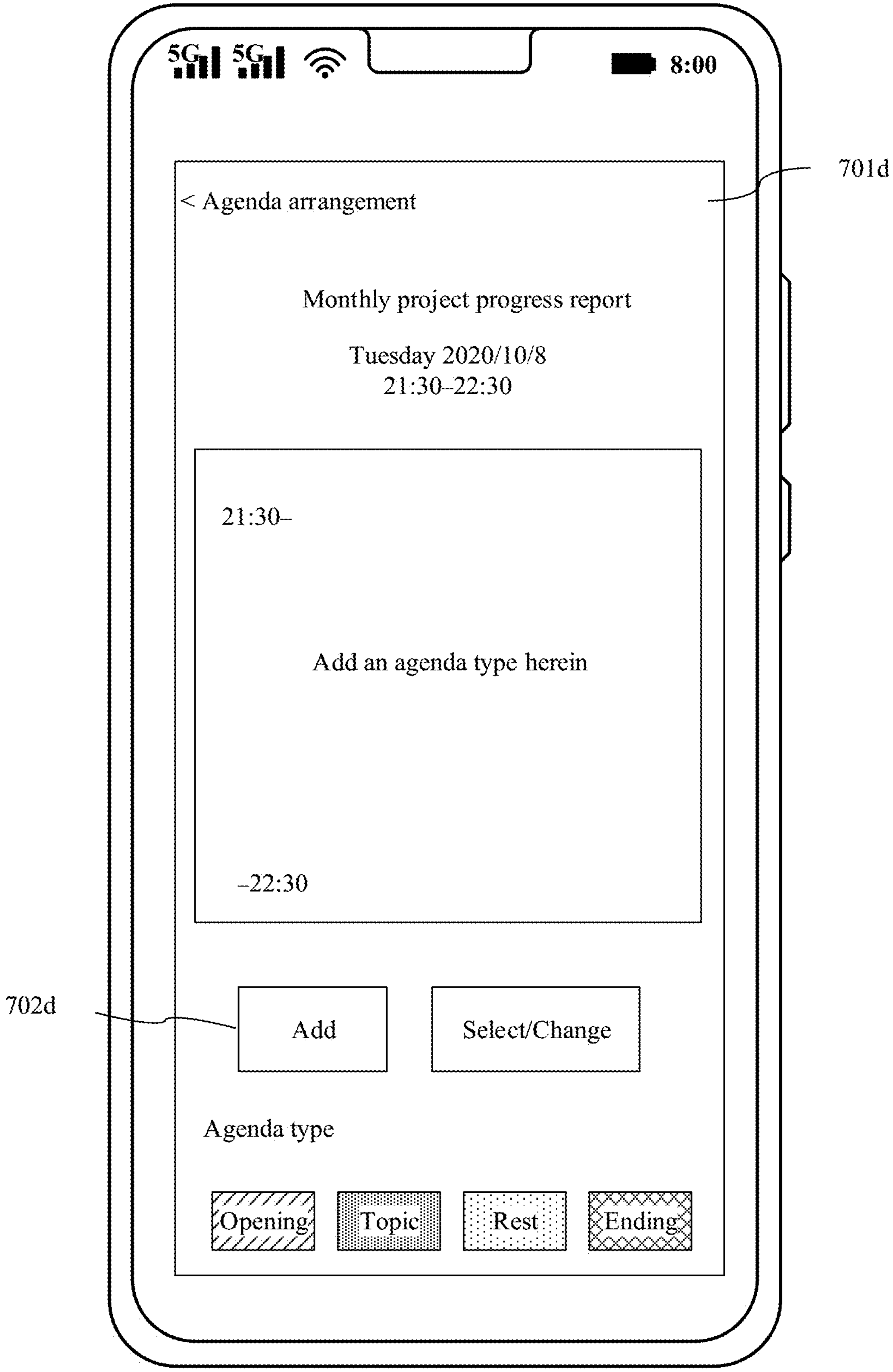
Figure 7E:
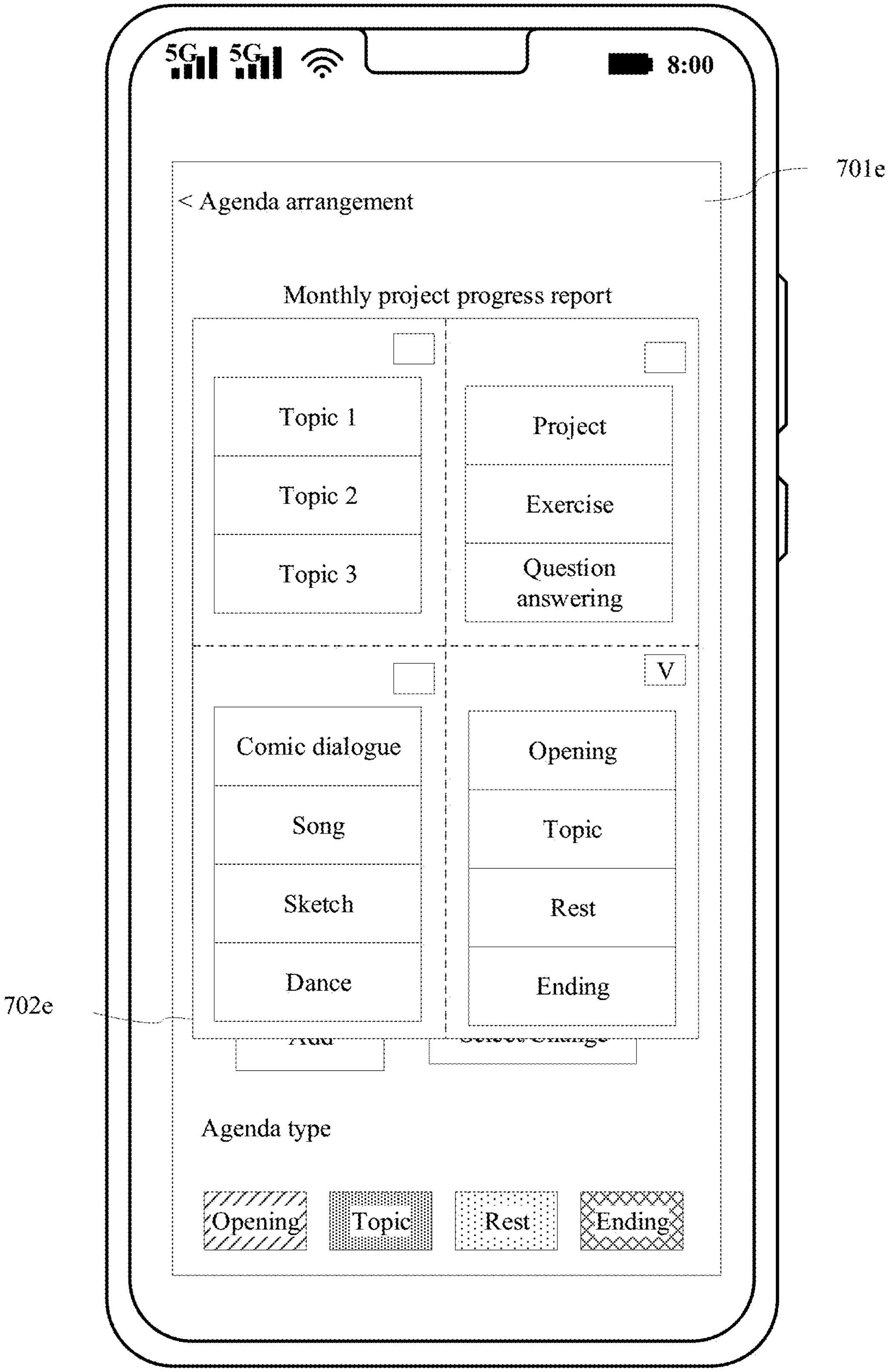
Figure 8:
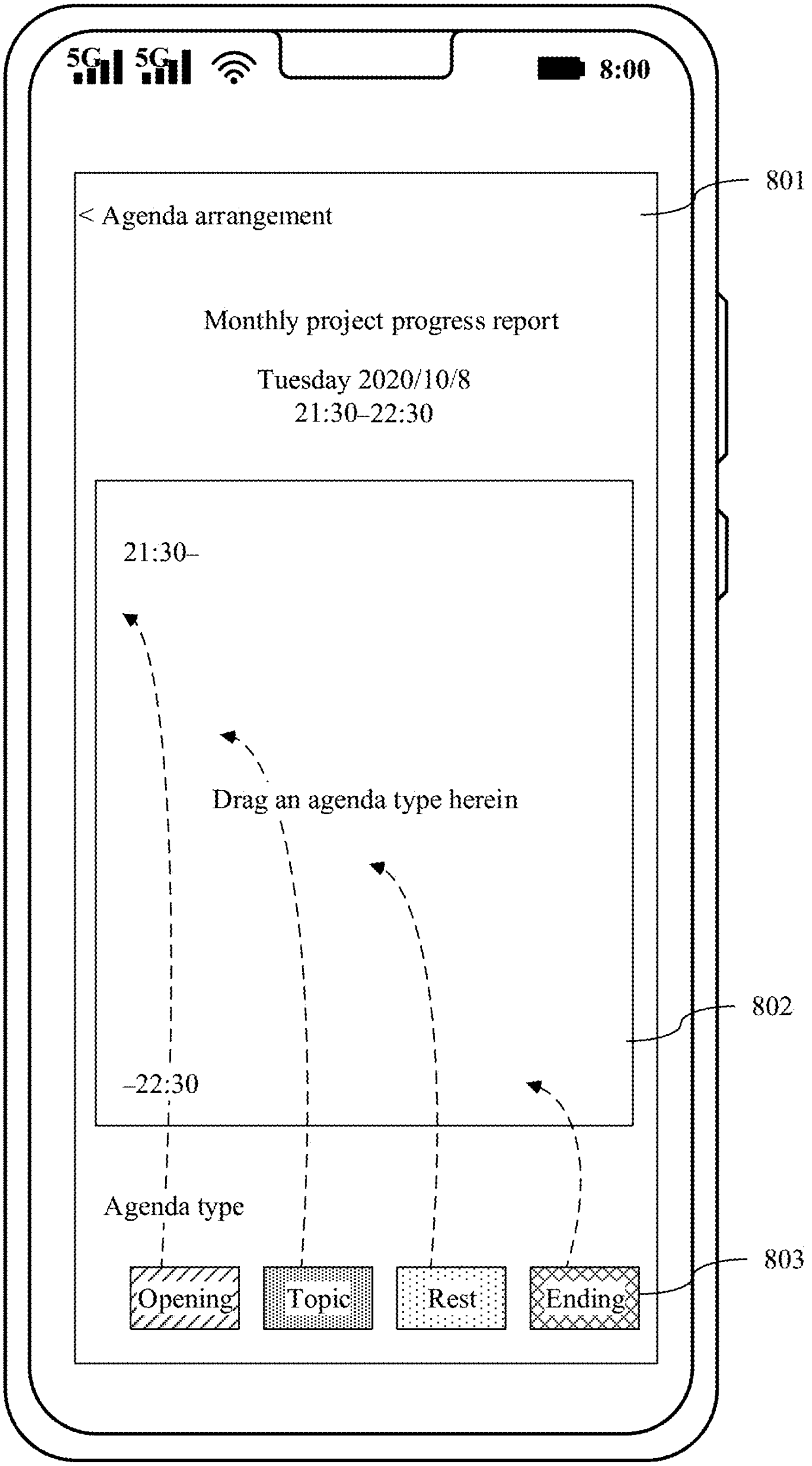
Figure 9:
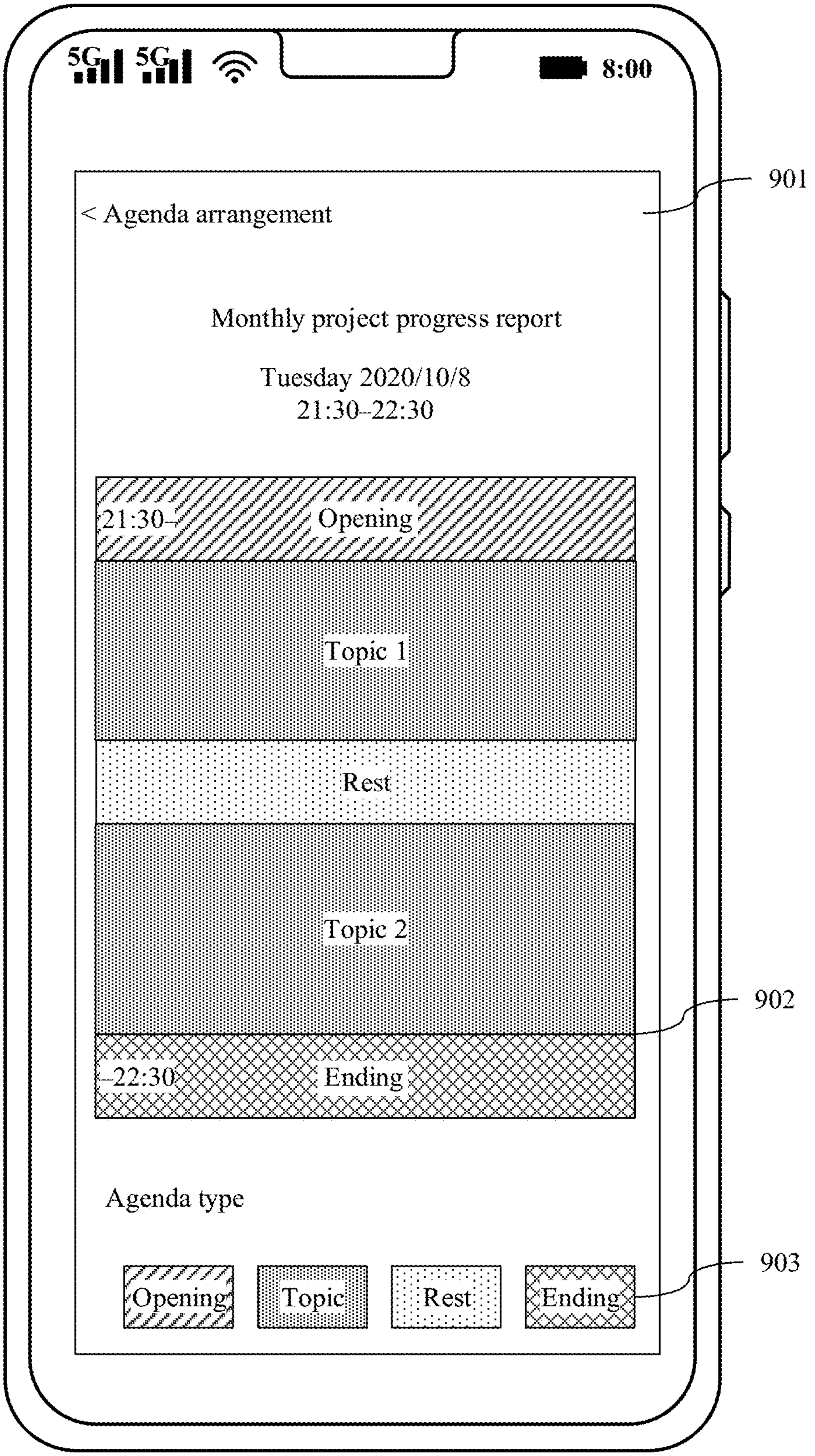
Figure 10:
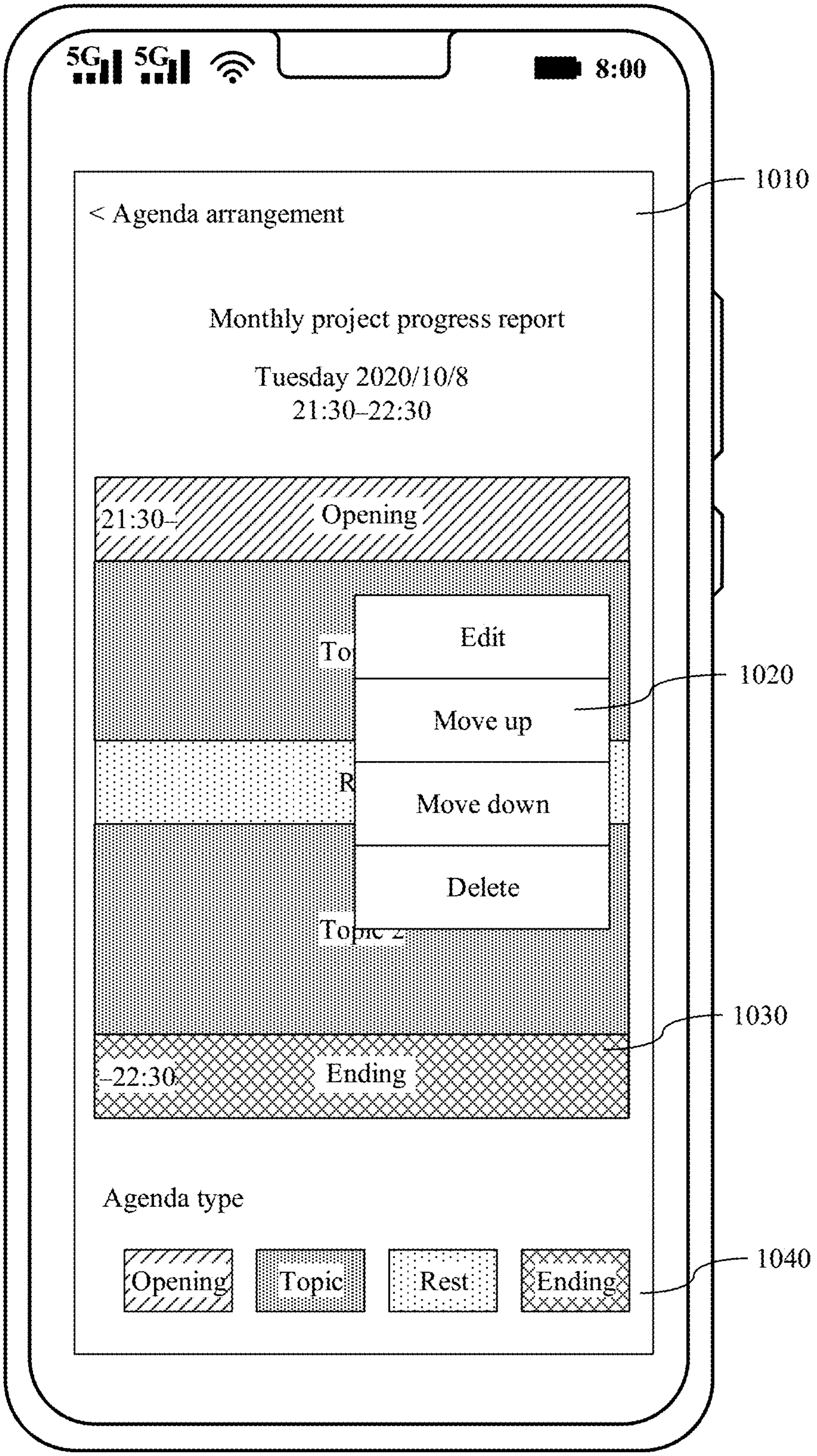
Figure 11:
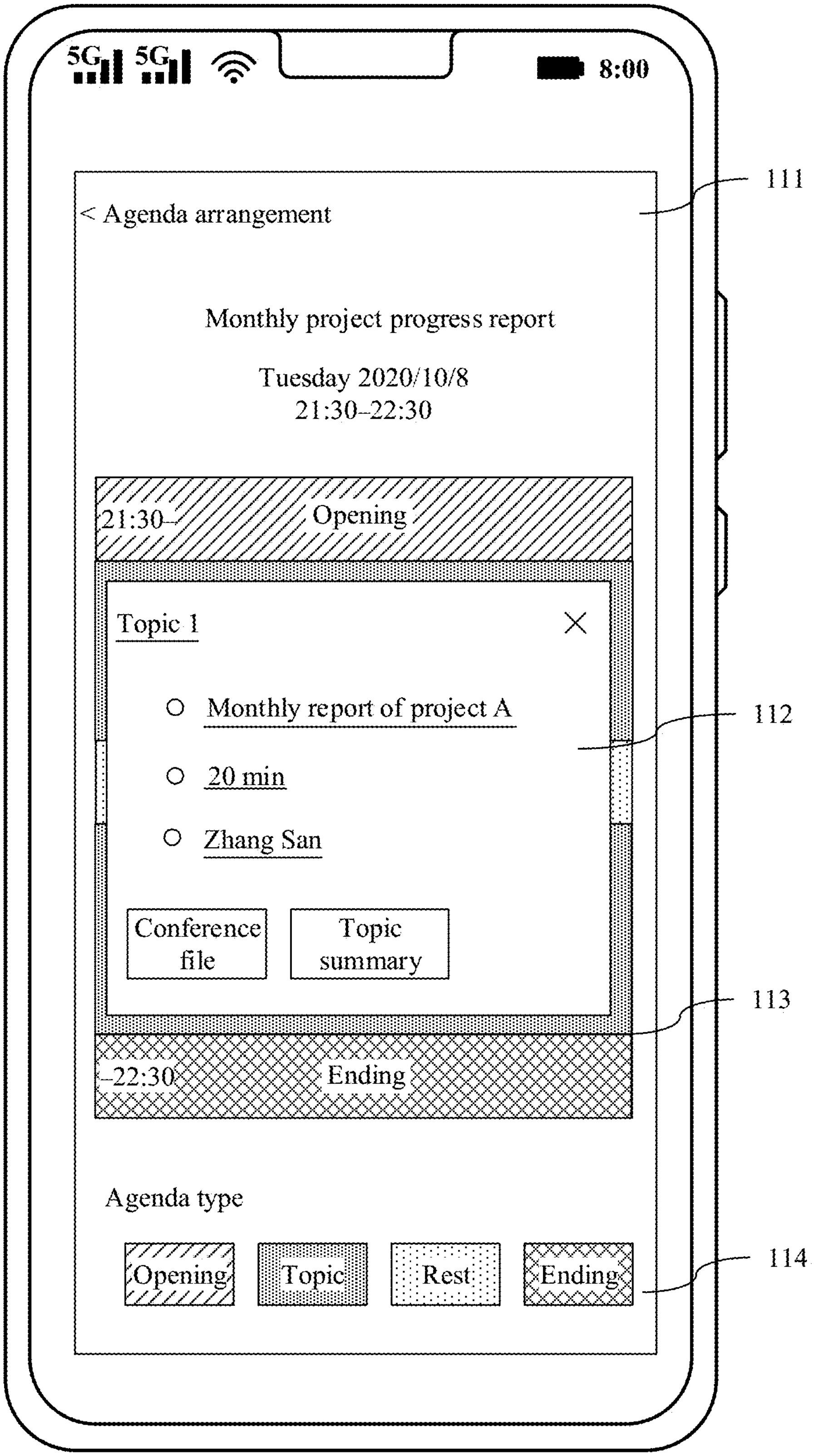
Figure 12:
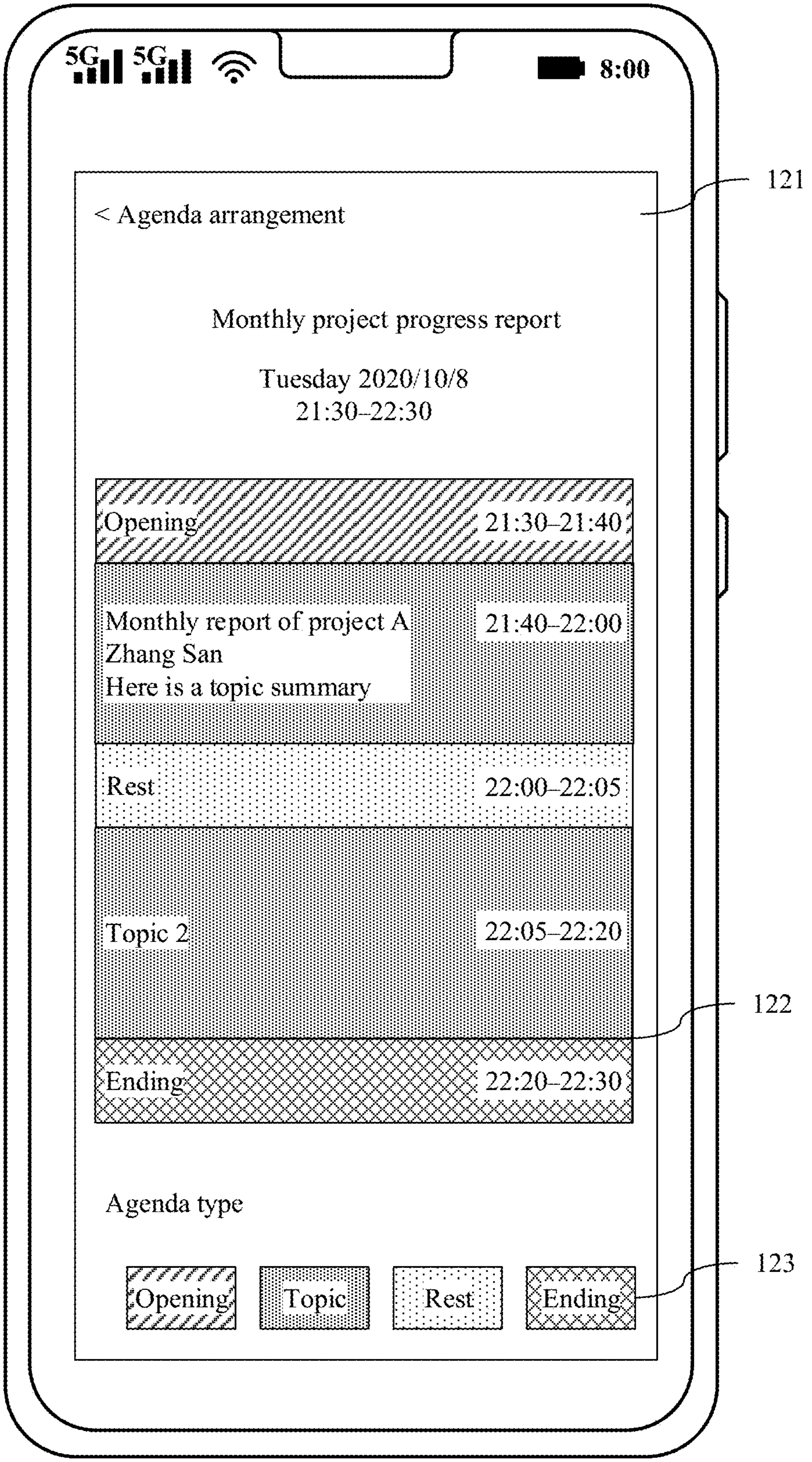
Figure 13A:
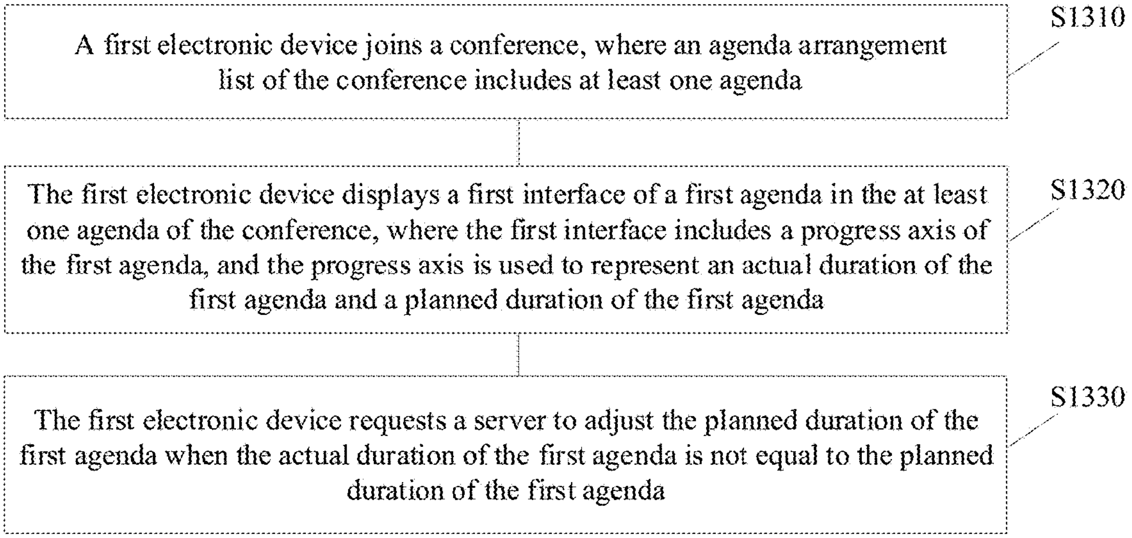
Figure 13B:
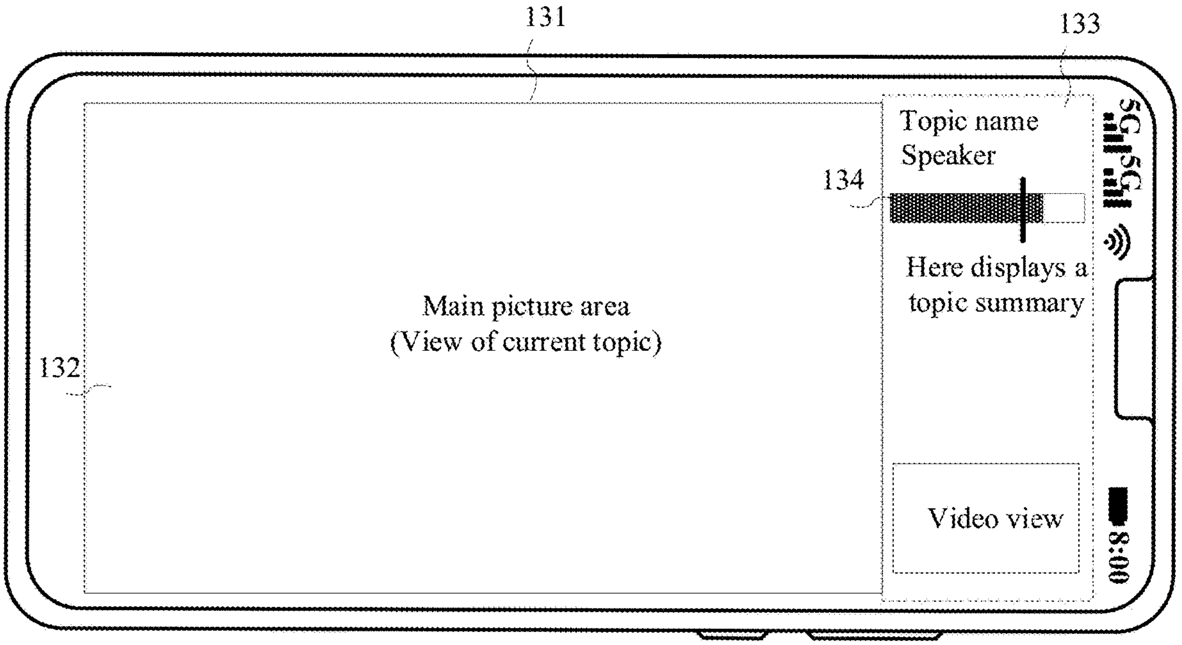
Figure 14:
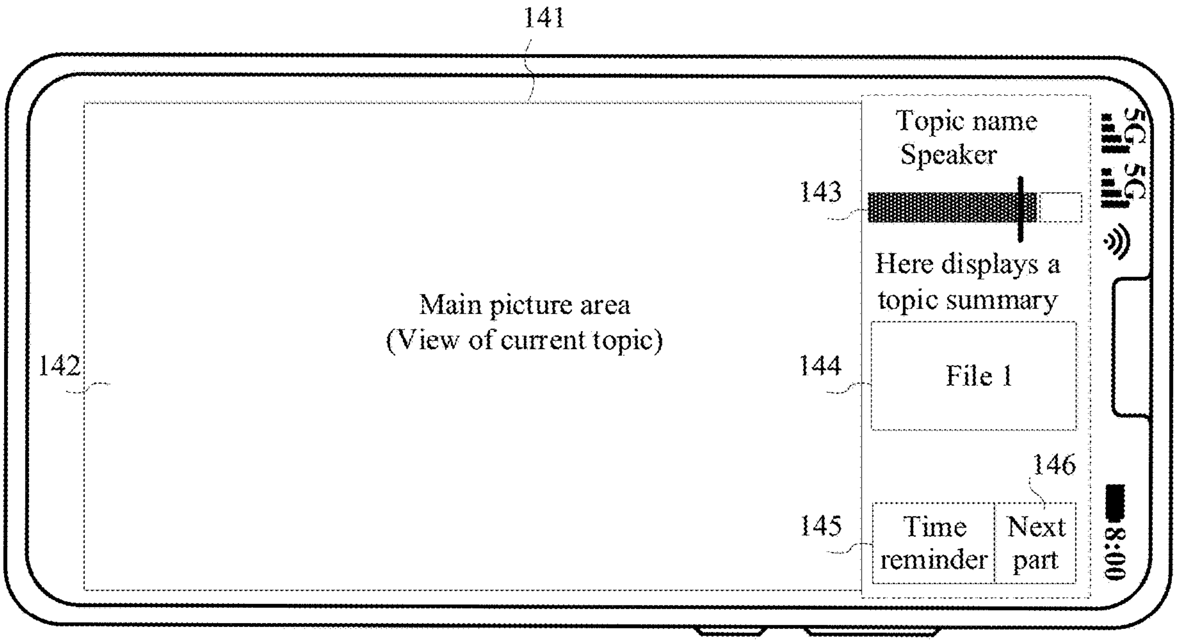
Figure 15:
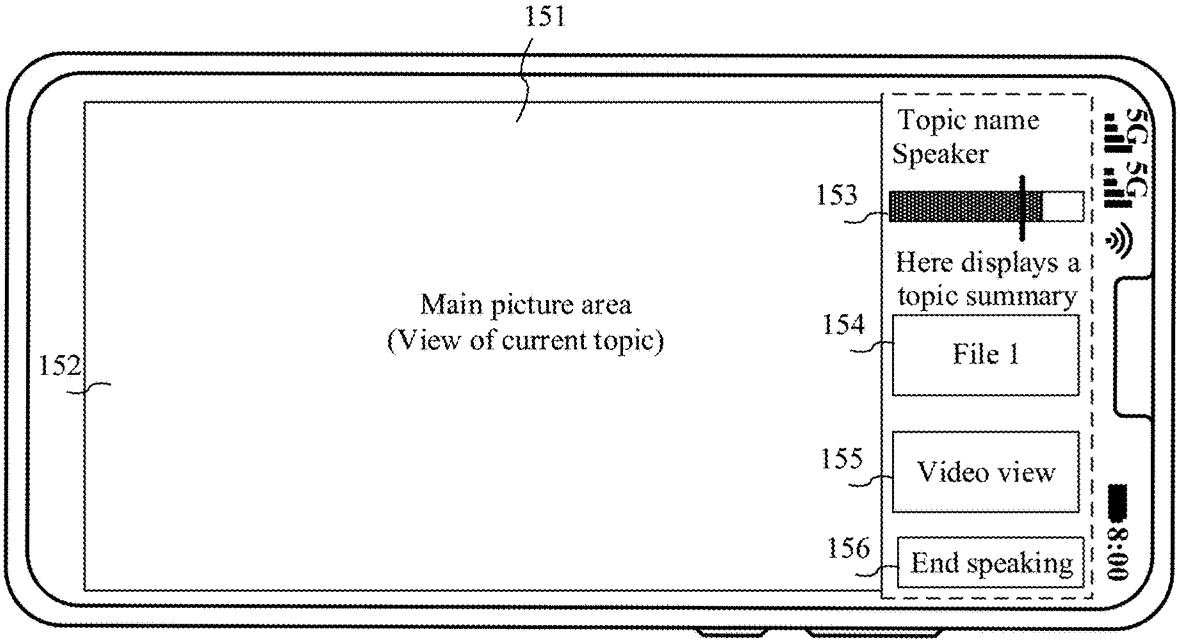
Figure 16:
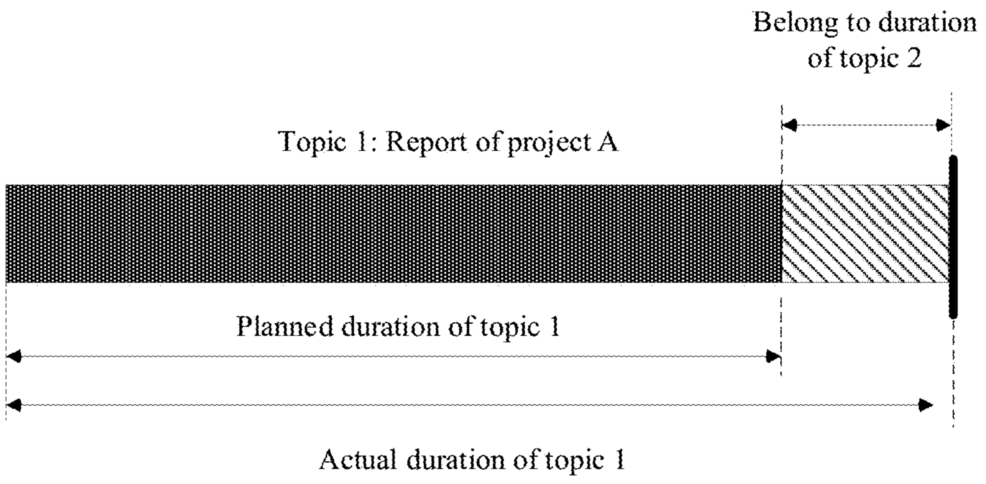
Figure 17:
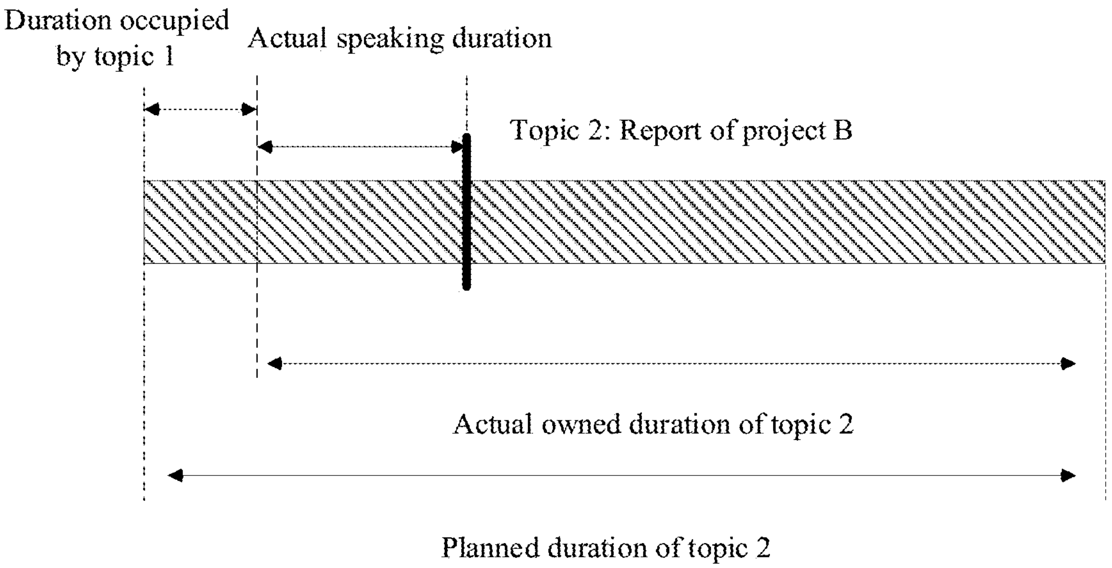
Figure 18:
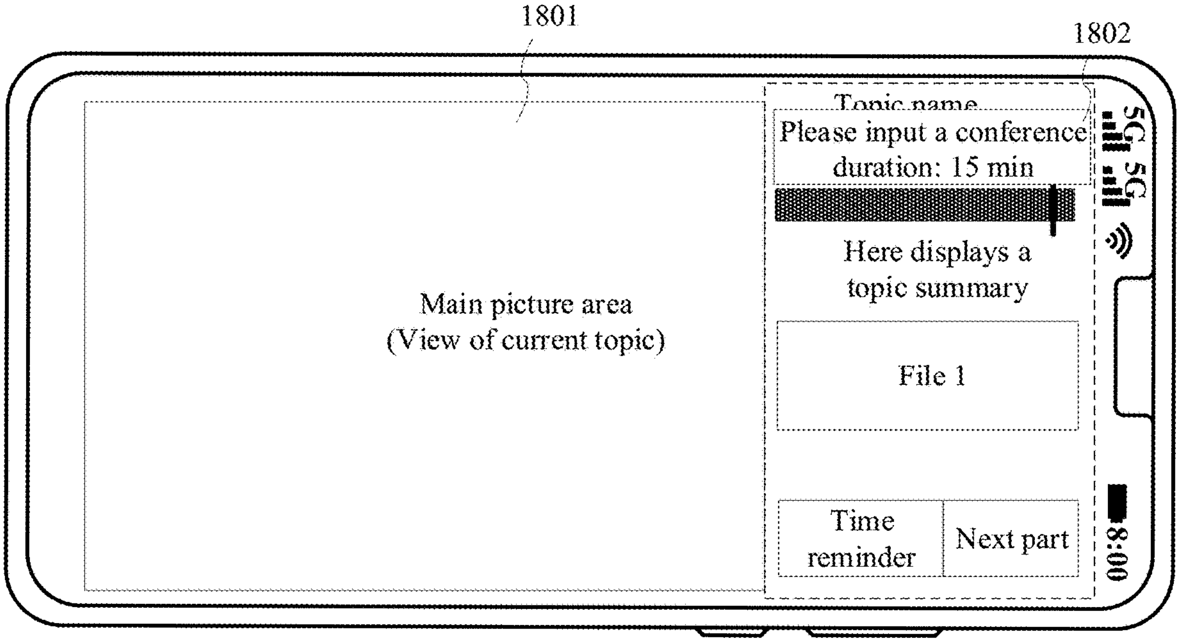
Figure 19:
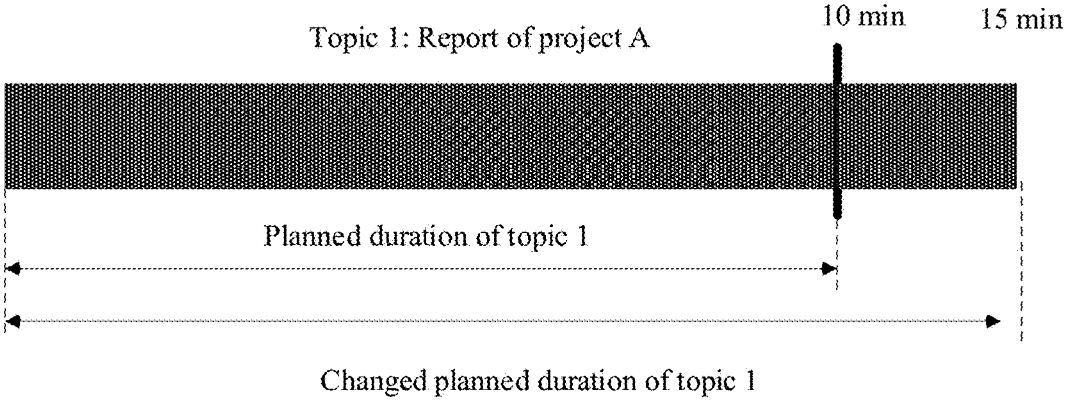
Figure 20:
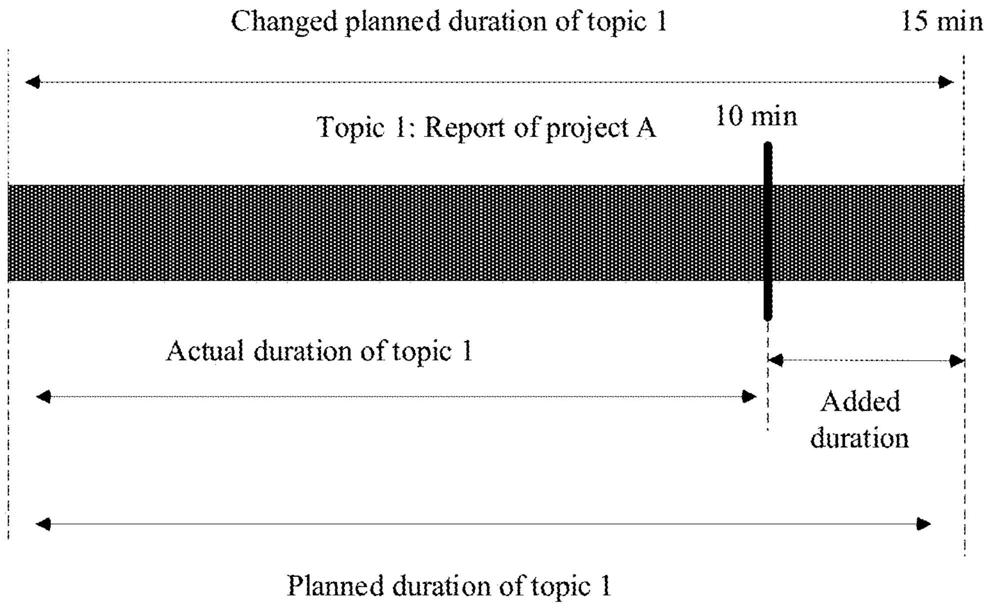
Figure 21:
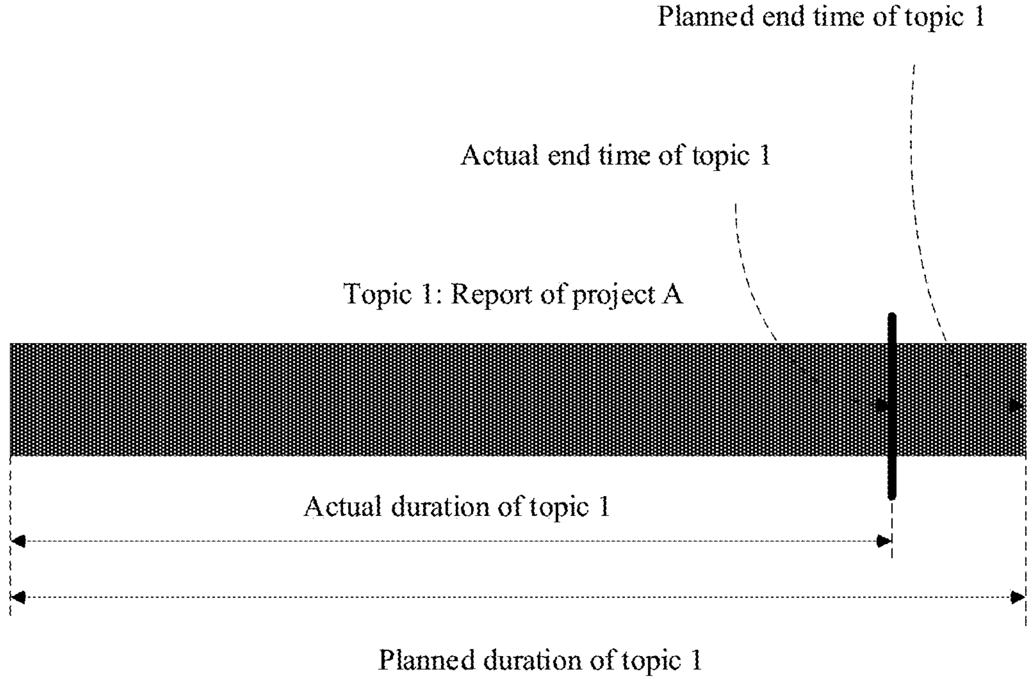
Figure 22:
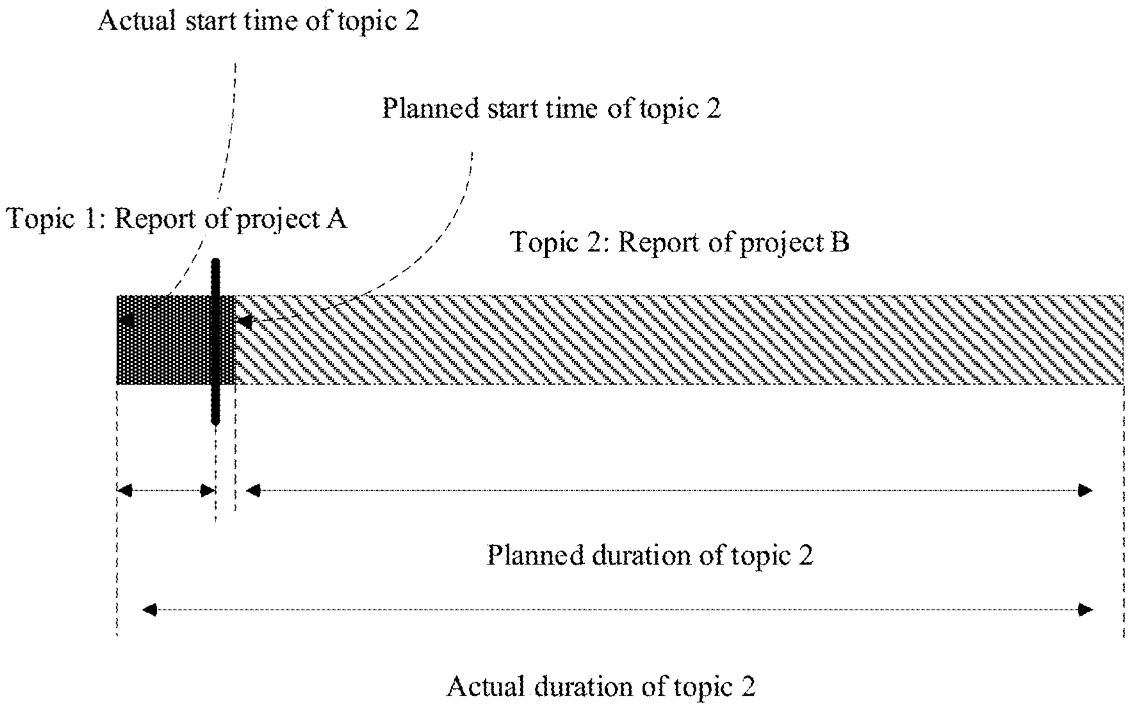
Figure 23:
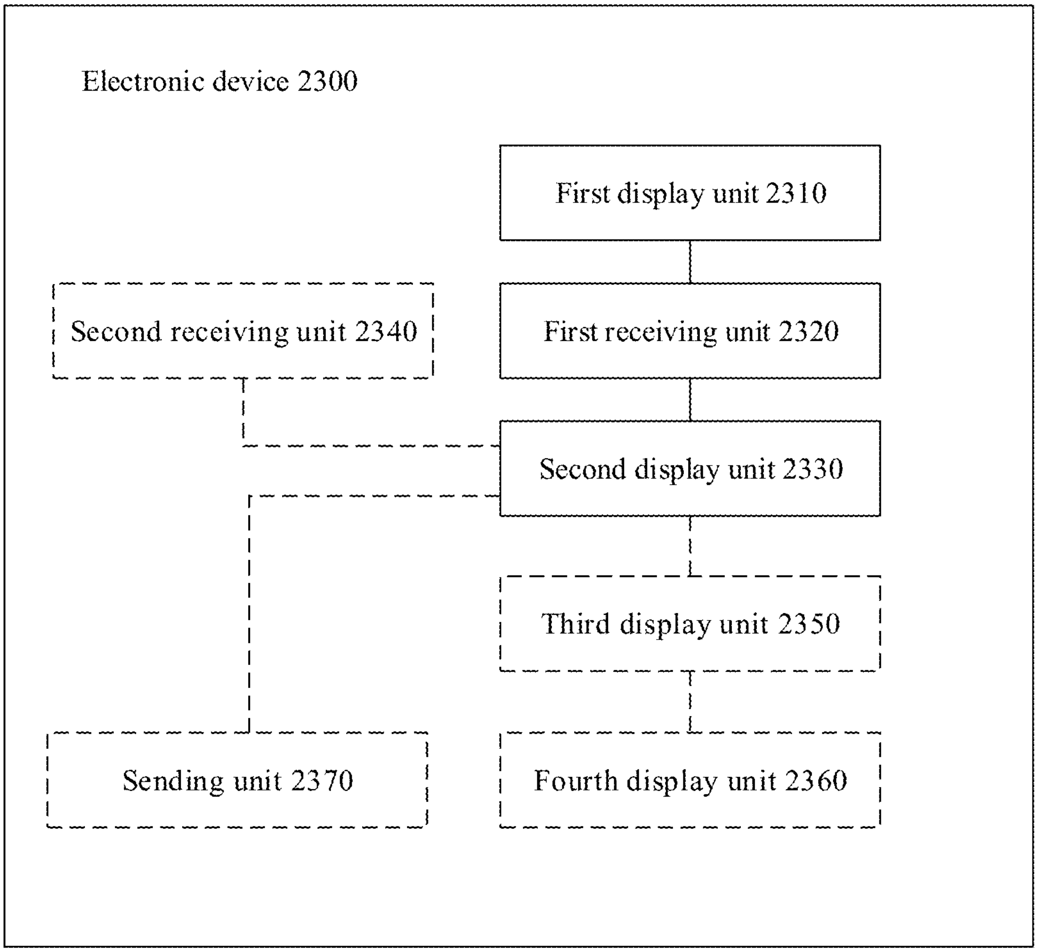
Figure 24:
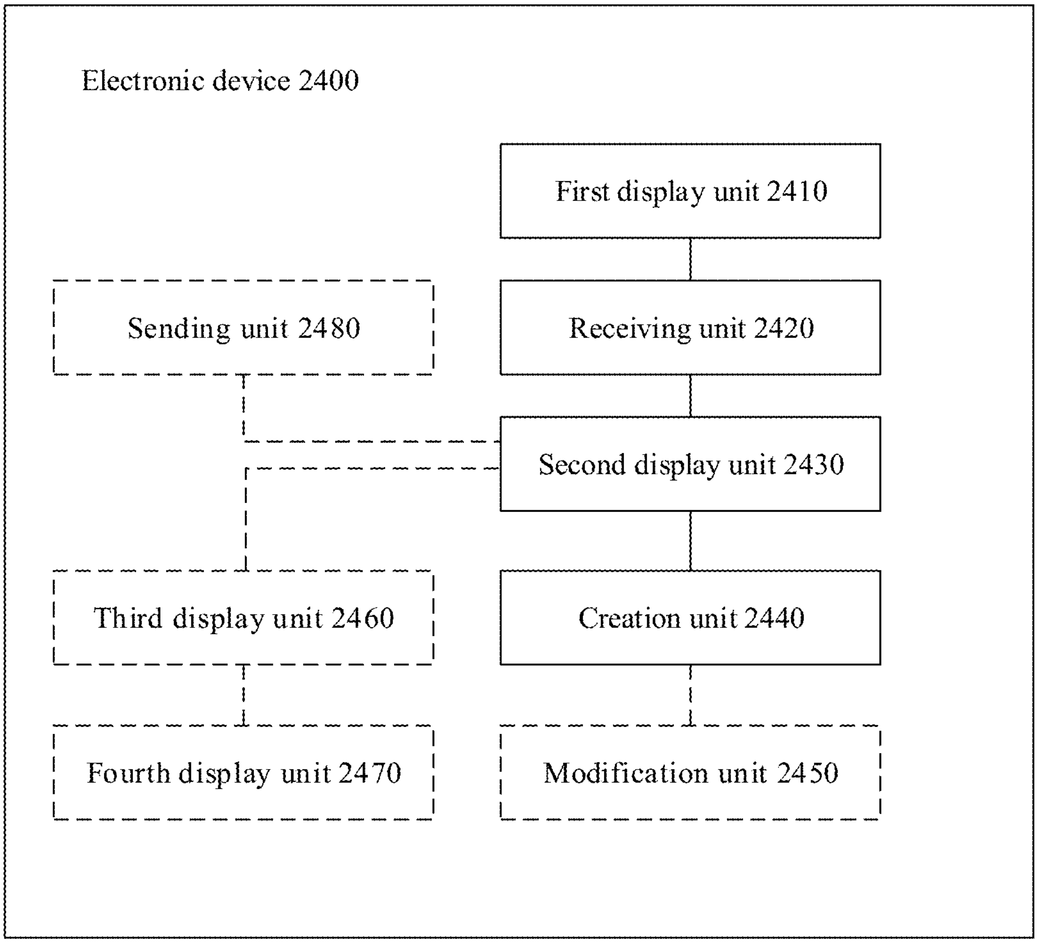
Figure 25:
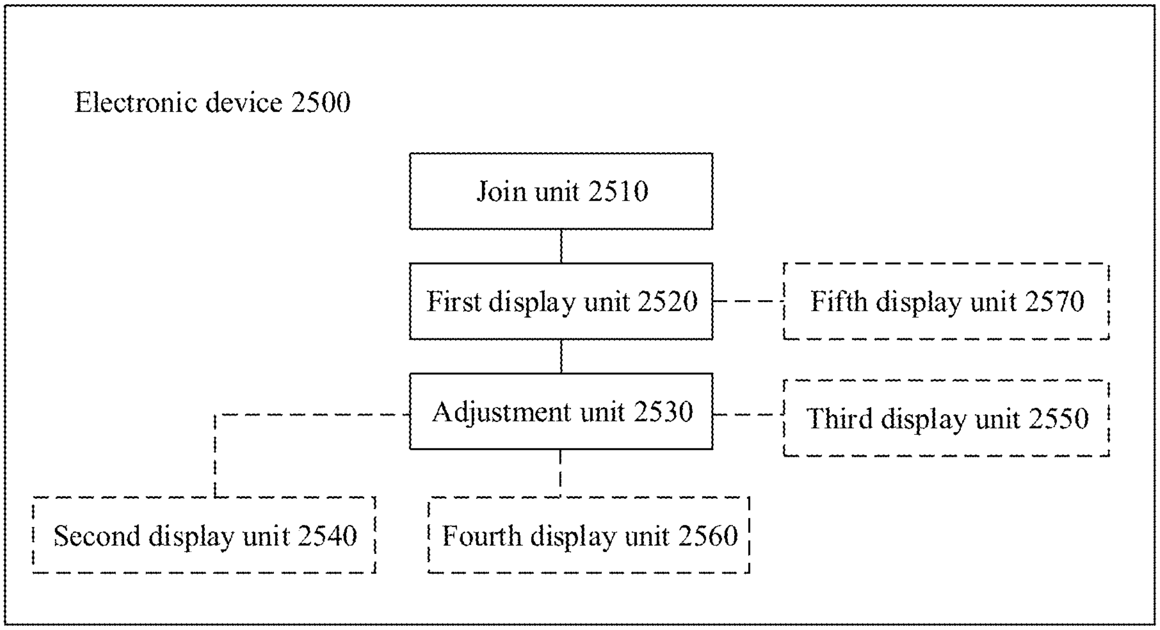

FIG. **4*a* is a schematic diagram 1** of a display interface of an electronic device according to an embodiment of this application;

FIG. 4*b* is a schematic diagram 2 of a display interface of an electronic device according to an embodiment of this application;

FIG. 5 is a schematic diagram of a display interface of an electronic device according to an embodiment of this application;

FIG. 6 is a schematic diagram of a conference details interface displayed on an electronic device according to an embodiment of this application;

FIG. 7*a* is a schematic diagram 1 of an agenda arrangement interface displayed on an electronic device according to an embodiment of this application;

FIG. 7*b* is a schematic diagram 2 of an agenda arrangement interface displayed on an electronic device according to an embodiment of this application;

FIG. 7*c* is a schematic diagram 3 of an agenda arrangement interface displayed on an electronic device according to an embodiment of this application;

FIG. 7*d* is a schematic diagram 4 of an agenda arrangement interface displayed on an electronic device according to an embodiment of this application;

FIG. 7*e* is a schematic diagram 5 of an agenda arrangement interface displayed on an electronic device according to an embodiment of this application;

FIG. 8 is a schematic diagram 6 of an agenda arrangement interface displayed on an electronic device according to an embodiment of this application;

FIG. 9 is a schematic diagram 7 of an agenda arrangement interface displayed on an electronic device according to an embodiment of this application;

FIG. 10 is a schematic diagram 8 of an agenda arrangement interface displayed on an electronic device according to an embodiment of this application;

FIG. 11 is a schematic diagram 9 of an agenda arrangement interface displayed on an electronic device according to an embodiment of this application;

FIG. 12 is a schematic diagram 10 of an agenda arrangement interface displayed on an electronic device according to an embodiment of this application;

FIG. 13*a* is a schematic flowchart of a conference control method according to an embodiment of this application;

FIG. 13*b* is a schematic diagram of a conference interface of an electronic device whose user is a participant according to an embodiment of this application;

FIG. 14 is a schematic diagram 1 of a conference interface of an electronic device whose user is a moderator according to an embodiment of this application;

FIG. 15 is a schematic diagram of a conference interface of an electronic device whose user is a speaker according to an embodiment of this application;

FIG. 16 is a schematic diagram 1 of a duration progress axis in an interface of a topic 1 displayed on an electronic device according to an embodiment of this application;

FIG. 17 is a schematic diagram 1 of a duration progress axis in an interface of a topic 2 displayed on an electronic device according to an embodiment of this application;

FIG. 18 is a schematic diagram 2 of a conference interface of an electronic device whose user is a moderator according to an embodiment of this application;

FIG. 19 is a schematic diagram 2 of a duration progress axis in an interface of a topic 1 displayed on an electronic device according to an embodiment of this application;

FIG. 20 is a schematic diagram 3 of a duration progress axis in an interface of a topic 1 displayed on an electronic device according to an embodiment of this application;

FIG. 21 is a schematic diagram 4 of a duration progress axis in an interface of a topic 1 displayed on an electronic device according to an embodiment of this application;

FIG. 22 is a schematic diagram 2 of a duration progress axis in an interface of a topic 2 displayed on an electronic device according to an embodiment of this application;

FIG. 23 is a schematic diagram of a structure of another electronic device according to an embodiment of this application;

FIG. 24 is a schematic diagram of a structure of another electronic device according to an embodiment of this application; and FIG. 25 is a schematic diagram of a structure of another electronic device according to an embodiment of this application.

DESCRIPTION OF EMBODIMENTS

In the following description, the terms "first" and "second" are merely intended for a purpose of description, and shall not be interpreted as indicating or implying relative importance or implying a quantity of indicated technical features. Therefore, a feature defined with "first" or "second" may explicitly or implicitly include one or more features. In descriptions of embodiments, unless otherwise specified, "a plurality of" means two or more.

With reference to accompanying drawings in embodiments of this application, the following describes a conference creation method and a conference control method that are provided in embodiments of this application.

Figure 1:
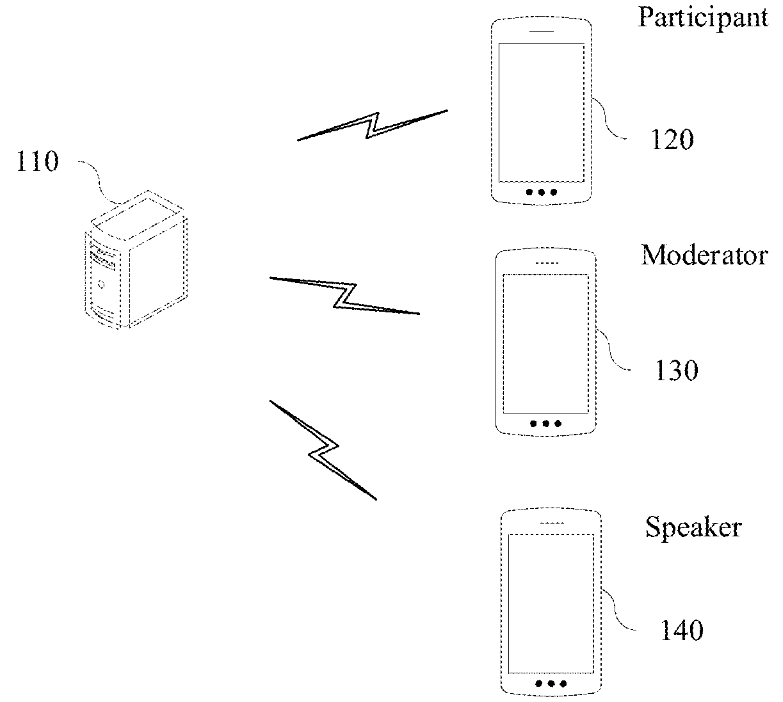
FIG. 1 is a schematic diagram of a structure of a conference system including an electronic device and a server according to an embodiment of this application.

Both the conference creation method and the conference control method that are provided in embodiments of this application may be applied to a conference system 100 shown in FIG. 1. As shown in FIG. 1, the conference system 100 may include one or more servers 110 and a plurality of (that is, two or more) electronic devices (such as an electronic device 120, an electronic device 130, and an electronic device 140).

The server 110 is connected to each of the plurality of electronic devices through a network. A network conference client is installed on each of the electronic device 120, the electronic device 130, and the electronic device 140, and the client may be configured to perform a network conference such as a video conference, an audio conference, or an online class. When a user interacts with the electronic device 120, the electronic device 120 transfers data exchanged between the user and the electronic device 120 to the server 110. The server 110 is configured to store data (for example, a configuration file or a template), perform data analysis and calculation, and then output data to the electronic device 130 and the electronic device 140, and the data is displayed on screens of the electronic devices. Similarly, when a user interacts with the electronic device 130, the electronic device 130 transfers data exchanged between the user and the electronic device 130 to the server 110. The server 110 performs storage, analysis, and calculation on the exchanged data, and then outputs the data to the electronic device 120 and the electronic device 140, and the data is displayed on screens of the electronic devices.

The electronic device 120 (or 130 or 140) may be an electronic device having a display function, such as a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable device, or a virtual reality electronic device. A specific form of the electronic device is not specially limited in this embodiment of this application.

Figure 2:
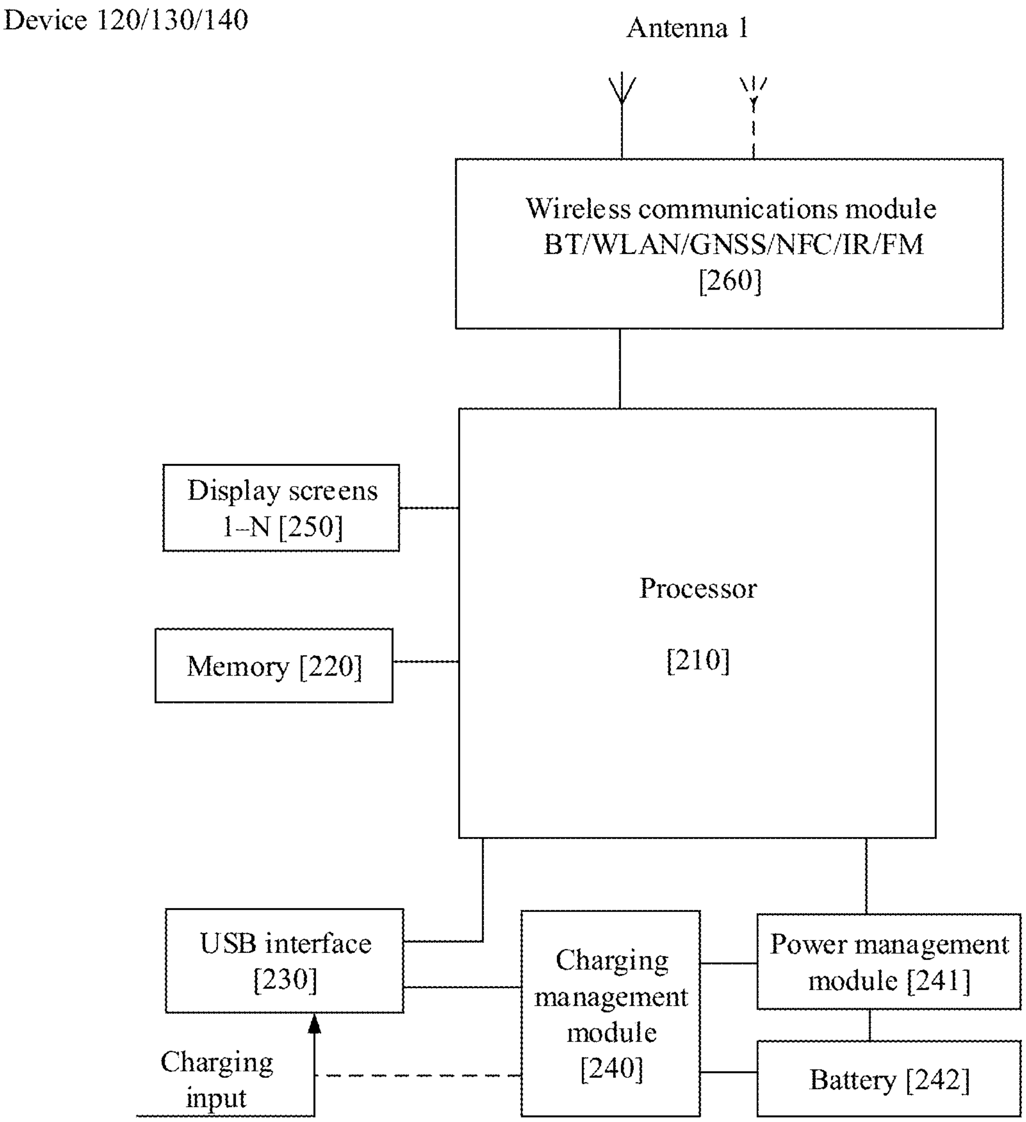
FIG. 2 is a schematic diagram of a structure of an electronic device according to an embodiment of this application.

FIG. 2 is a schematic diagram of a structure of the electronic device 120/130/140.

As shown in FIG. 2, the electronic device 120 may include a processor 210, a memory 220, a universal serial bus (USB) interface 230, a charging management module 240, a power management module 241, a battery 242, a display screen 250, an antenna 1, a wireless communications module 260, and the like.

It may be understood that the structure shown in this embodiment of the present disclosure does not constitute a specific limitation on the electronic device 120. In some other embodiments of this application, the electronic device 120 may include more or fewer components than those shown in the figure, or have some components combined, or have some components split, or have a different component arrangement. The components shown in the figure may be implemented by hardware, software, or a combination of software and hardware.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a timing signal, to control instruction fetching and instruction execution.

A memory may be further disposed in the processor 210, to store instructions and data. In some embodiments, the memory in the processor 210 is a cache. The memory may store instructions or data that has been used or is cyclically used by the processor 210. If the processor 210 needs to use the instructions or the data again, the processor may directly invoke the instructions or the data from the memory. This avoids repeated access, and reduces a waiting time of the processor 210, thereby improving system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that the interfacing relationship between modules that is shown in this embodiment of the present disclosure is merely an example for description, and does not constitute a limitation on the structure of the electronic device 120. In some other embodiments of this application, the electronic device 120 may alternatively use an interfacing manner different from that in the foregoing embodiment, or use a combination of a plurality of interfacing manners.

The memory 220 may be configured to store computer-executable program code. The executable program code includes instructions. The memory 220 may include a program storage area and a data storage area. The program storage area may store an operating system, an application required by at least one function (for example, a sound playing function or an image playing function), and the like. The data storage area may store data (such as audio data and an address book) created during use of the electronic device 120, and the like. In addition, the memory 220 may include a high-speed random access memory, or may include a non-volatile memory, for example, at least one magnetic disk storage, a flash memory, or a universal flash storage (UFS). The processor 210 executes various function applications and data processing of the electronic device 120 by running the instructions stored in the memory 220 and/or the instructions stored in the memory disposed in the processor.

The charging management module 240 is configured to receive a charging input from a charger. The charger may be a wireless charger, or may be a wired charger. In some embodiments of wired charging, the charging management module 240 may receive a charging input of the wired charger through the USB interface 230. In some embodiments of wireless charging, the charging management module 240 may receive a wireless charging input by using a wireless charging coil of the electronic device 120. When charging the battery 242, the charging management module 240 may further supply power to the electronic device by using the power management module 241.

The power management module 241 is configured to connect the battery 242, the charging management module 240, and the processor 210. The power management module 241 receives an input from the battery 242 and/or the charging management module 240, and supplies power to the processor 210, an memory 220, the display screen 250, the wireless communications module 260, and the like. The power management module 241 may be further configured to monitor parameters such as a battery capacity, a battery cycle count, and a state of health (leakage or impedance) of the battery. In some other embodiments, the power management module 241 may alternatively be disposed in the processor 210. In some other embodiments, the power management module 241 and the charging management module 240 may alternatively be disposed in a same component.

A wireless communications function of the electronic device 120 may be implemented by using the antenna 1, the wireless communications module 260, the modem processor, the baseband processor, and the like.

The antenna 1 is configured to transmit and receive electromagnetic wave signals. Each antenna in the electronic device 120 may be configured to cover one or more communications bands. Different antennas may be further multiplexed to improve antenna utilization. In some other embodiments, the antenna may be used in combination with a tuning switch.

The electronic device 120 implements a display function by using the GPU, the display screen 250, the application processor, and the like. The GPU is a microprocessor for image processing, and is connected to the display screen 250 and the application processor. The GPU is configured to perform mathematical and geometric calculation for graphics rendering. The processor 210 may include one or more GPUs that execute a program instruction to generate or change display information.

The display screen 250 is configured to display an image, a video, and the like. The display screen 250 includes a display panel. The display panel may use a liquid crystal display (LCD), an organic light-emitting diode (OLED), an active-matrix organic light-emitting diode (active-matrix organic light-emitting diode, AMOLED), a flexible light-emitting diode (FLED), a mini-LED, a micro-LED, a micro-OLED, a quantum dot light-emitting diode (QLED), or the like. In some embodiments, the electronic device 120 may include one or N display screens 250. N is a positive integer greater than 1.

In this embodiment of this application, the display screen 250 may be configured to display a conference interface, and the conference interface may include a conference creation control. For a method for determining the control, refer to related content in embodiments of this application. Details are not described herein.

The wireless communications module 260 may provide a wireless communications solution that is applied to the electronic device 120 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communications module 260 may be one or more components integrating at least one communications processing module. The wireless communications module 260 receives an electromagnetic wave by using the antenna 1, performs frequency modulation and filtering processing on the electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation by using the antenna 1.

Certainly, the electronic device 120 may further include another functional unit. This is not limited in this embodiment of this application.

A software system of the electronic device 120 may use a layered architecture, an event-driven architecture, a microkernel architecture, a microservice architecture, or a cloud architecture.

Figure 3:
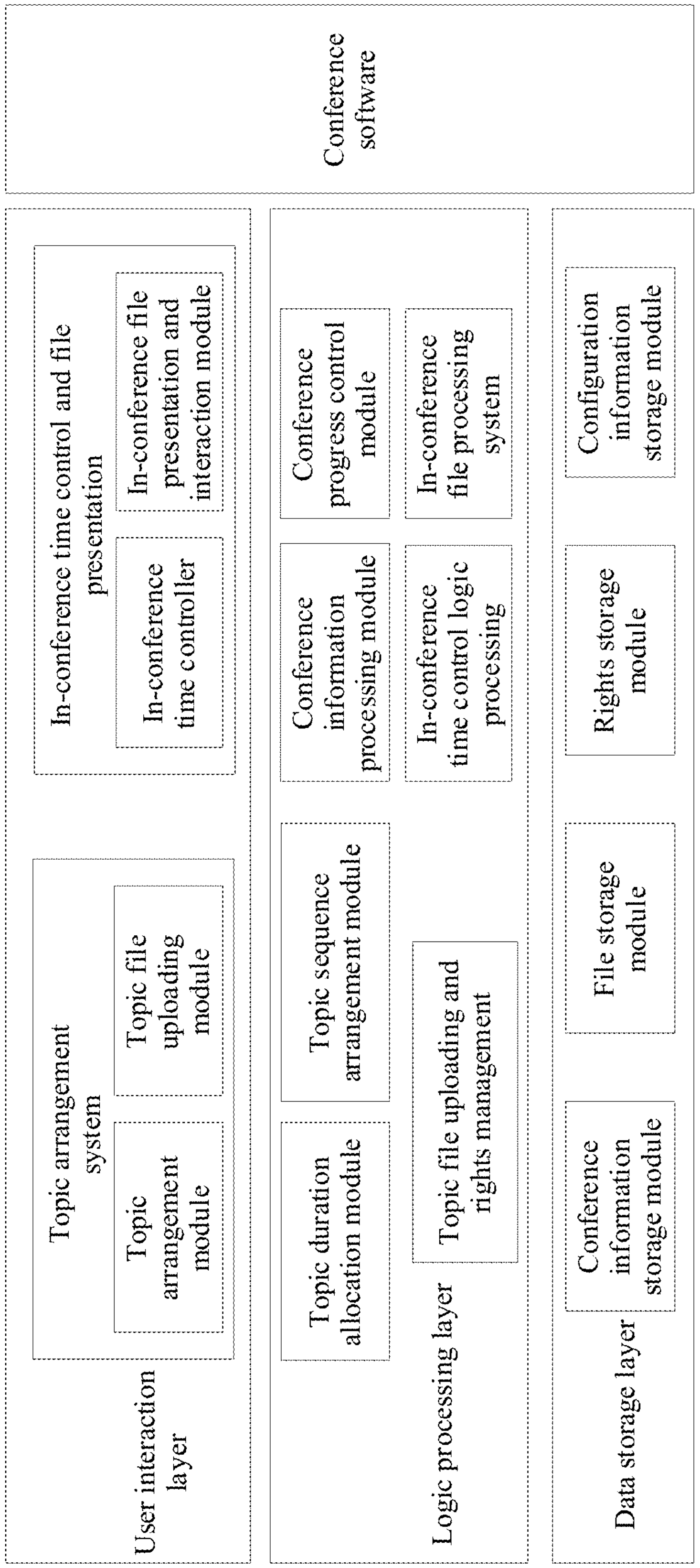
FIG. 3 is a block diagram of a software structure of an electronic device according to an embodiment of this application.

FIG. 3 is a block diagram of a software structure of the electronic device 120 according to an embodiment of this application.

Conference software of the electronic device 120 in this embodiment of this application may include a basic function and an extended function. The basic function may be used to provide functions such as network communication, data storage, and view presentation. The extended function may be used to create and control conferences. The conference software may use a layered architecture. That is, the conference software is divided into several layers, and each layer is assigned a clear role and task. The layers communicate with each other through a software interface. In some embodiments, the conference software may be as follows from top to bottom, as shown in FIG. 3:

1. A user interaction layer is configured to implement interaction between the electronic device and the user. In an example, the user interaction layer may include a pre-conference topic arrangement system and an in-conference time control and file presentation system. The topic arrangement system may include a topic arrangement module and a topic file uploading module. The in-conference time control and file presentation system may include an in-conference time controller and an in-conference file presentation and interaction module.

The topic file uploading module may be configured to transmit a file and topic information to a logic processing layer. In an example, in response to receiving an operation performed by the user in a graphical interface presented by the in-conference file presentation and interaction module, the topic file uploading module uploads a file to a specified area of a topic, and transfers the file and topic information to the logic processing layer. Finally, the logic processing layer completes uploading the file, and logically binds the file and the corresponding topic information.

The topic arrangement module may be configured to receive a conference topic input by the user, arrange and design a topic and the like, and receive topic data processed by the logic processing layer. In an example, the graphical interface may include topic graphs representing different topic types. When the user operates topic graphs representing the different topic types in the graphical interface, for example, the user drags the topic graphs representing the different topic types to a topic arrangement area of the graphical interface, the topic arrangement module determines an arrangement sequence of topics, and graphically displays the topic data processed by the logic processing layer, the topic arrangement sequence, and topic durations.

The in-conference time controller may be configured to control time of each topic, and present conference progress. In an example, the in-conference time controller may present, to the user in a first predetermined form (for example, a graph/text/voice), time information of current and next agendas of a conference, a current conference time progress mark, and a finish time node in current progress.

The in-conference file presentation and interaction module may be configured to present the file and the topic information, and support the user in operating the file. In an example, the in-conference file presentation and interaction module presents the file and the topic information to the user in a graphical interface form.

2. The logic processing layer is configured to receive interaction information generated by the user interaction layer, process the interaction information logically by using an independent capability of a module or a combined capability of a plurality of modules, and send a processing result to a data storage layer for storage. In an example, the logic processing layer may include a topic duration allocation module, a topic sequence arrangement module, a topic file uploading and rights management module, a conference progress control module, a conference information processing module, an in-conference time controller logic module, and an in-conference file processing system.

The topic duration allocation module may be configured to receive the conference topic information transferred by the user interaction layer, allocate a conference topic duration, and transfer the allocated conference topic duration to the data storage layer. In an example, the topic duration allocation module receives the conference topic information transferred by the user interaction layer, obtains a duration of a topic based on the topic information and with reference to default configuration of agenda division by using a division algorithm, and transfers basic information of the topic and the duration to the data storage layer for storage.

The topic sequence arrangement module may be configured to arrange a topic sequence. In an example, the topic sequence arrangement module receives the conference topic information transferred by the user interaction layer, reads other topics of the conference by using the data storage layer, and re-arranges, by using a topic arrangement algorithm, and stores the topic sequence of the conference.

The topic file uploading and rights management may be configured to receive conference information transferred by the user interaction layer, establish a rights relationship between a file, a user, and a topic in the conference information, and transfer the information to the data storage layer. In an example, the topic file uploading and rights management receives conference material file information, transferred by the user interaction layer, of a current topic, establishes a rights relationship between a file, a user, and the topic, and transfers the information to the data storage layer, so that the data storage layer stores the information.

The conference progress control module may be configured to control conference progress. In an example, the conference progress control module provides a conference progress control capability, which may include entering a next topic, making a reminder of topic time, suspending a conference, and the like. The conference progress control module may further provide current conference process information, which may include information such as a current conference duration.

The conference information processing module may be configured to externally provide basic information of the conference and all topics of the conference.

The in-conference time controller logic module may be configured to control in-conference time. In an example, the in-conference time controller logic module calculates required topic information and conference progress information with reference to the current topic information provided by the conference information processing module and the conference progress information of the in-conference progress control module.

The in-conference file processing system may be configured to provide capabilities of reading, opening, and playing conference material files.

3. The data storage layer is configured to store conference and agenda information, configuration information, user information, file information, and association relationship and rights information between the foregoing information. In an example, the data storage layer may include a conference information storage module, a file storage module, a rights storage module, and a configuration information storage module.

The conference information storage module may be configured to store information about a conference and a related topic.

The file storage module may be configured to store a conference material file.

The rights and relationship storage module may be configured to store rights relationships between a user and a topic, between a user and a file, and between a topic and a file.

The configuration information storage module may be configured to store configuration information such as an agenda arrangement rule and an agenda duration calculation rule.

The following uses the architectures shown in FIG. 2 and FIG. 3 as examples to describe the conference creation method and the conference control method that are provided in embodiments of this application. Units in the following embodiments may have components shown in FIG. 2 and FIG. 3. Details are not described again. It should be noted that, in embodiments of this application, names of messages exchanged between electronic devices, names of parameters in the messages, or the like are merely examples. Other names may alternatively be used during embodiment. In embodiments of this application, "create" may also be understood as "generate" or determine, and "include" in embodiments of this application may also be understood as "carry", which is uniformly described herein. This is not specifically limited in embodiments of this application.

At present, in a conference creation method, a dedicated person (for example, a conference moderator) is usually responsible for managing conference materials in a video conference, a procedure of the conference, and time of topics in the conference. The conference moderator determines a conference subject and conference time and collects information such as the conference topics, the conference materials, and participants in advance. If the topics in the video conference have strict time requirements, the moderator determines specific time of the topics. The conference moderator logs in to a video conference system on an electronic device. The video conference system may include a conference creation function. The conference moderator inputs the conference topics and information (for example, information such as the specific time of the topics and topic speakers) one by one into the video conference system. The video conference system generates a video conference record based on the information input by the conference moderator, to complete video conference creation. However, the foregoing conference creation process includes a relatively large quantity of manual intervention operations, which takes a long time to create a conference.

To resolve the foregoing problem, an embodiment of this application provides another conference creation method. In this method, a first operation of starting a conferencing application by a user is received, a first electronic device starts the conferencing application, and the first electronic device enters a first interface. In response to receiving an operation performed by the user in the first interface, the first electronic device enters a second interface. The second interface includes an input box for inputting information and a first control for creating a conference. The user inputs conference information in the input box of the second interface. The conference information includes a conference name, a start time, and an end time. A third interface is displayed in response to receiving an operation performed by the user on the first control in the second interface. The third interface includes an agenda arrangement list, and the agenda arrangement list includes at least one agenda. A conference is created by setting configuration information (such as an agenda template and a duration) for each agenda. Subsequently, a moderator or a speaker may edit an agenda in the agenda arrangement list, for example, uploading a conference material. Therefore, in this embodiment of this application, a conference architecture is formed based on the conference information, and an agenda in the agenda arrangement list is edited and adjusted based on the formed conference architecture, thereby reducing conference creation operations and implementing quick conference creation.

Further, to flexibly adjust time of an agenda in the conference arrangement list, in the conference creation method provided in this embodiment of this application, a start time and an end time of each agenda may be further determined by adjusting a duration of each agenda.

The following describes in detail the conference creation method provided in this embodiment of this application.

FIG. 4 is a schematic flowchart of a conference creation method according to an embodiment of this application. As shown in FIG. 4, the method includes the following operations.

S410: A first electronic device receives a first operation of starting a conferencing application by a user, and starts the conferencing application.

When the user needs to create a conference, the user may use the first electronic device to log in to a conference system (such as a video conference system, an audio conference system, or an online class system). The conference system has a conference creation function. For example, the user may tap a conferencing APP icon to start the conferencing APP. After the conferencing APP is started, an interface 401*a* shown in FIG. 4*a* is displayed on a screen of the first electronic device. When the user taps a conference joining control shown in FIG. 4*a*, the first electronic device may display a conference login interface. The conference login interface may include a conference ID input box. The user may input a conference ID in the conference ID input box to join a conference. When the user taps a login control shown in FIG. 4*a*, a display interface of the first electronic device may jump to a first interface 401*b* shown in FIG. 4*b*. Certainly, after the conferencing APP is started, the first electronic device may alternatively directly enter the first interface 401*b* shown in FIG. 4*b*. This is not specifically limited in this embodiment of this application. The foregoing interfaces may be interfaces in other forms, which are not listed one by one herein.

S420: The first electronic device displays a second interface in response to receiving an operation performed by the user in the first interface, where the second interface includes an input box for inputting information and a first control for creating a conference.

The operation performed by the user in the first interface may be understood as an operation performed by the user in an area of the first interface, or an operation performed by the user on a control in the first interface. For example, when the user operates an area 402*b* of the first interface 401*b* shown in FIG. 4*b*, the display interface of the first electronic device jumps from FIG. 4*b* to a second interface 501 shown in FIG. 5. Alternatively, when the user operates a control 403*b* in the first interface 401*b* shown in FIG. 4*b*, the display interface of the first electronic device jumps from FIG. 4*b* to the second interface 501 shown in FIG. 5. The second interface 501 may include an input box, for example, a conference name input box 502, a start time and end time setting box 503, and a participant adding box 504. The second interface may further include a first control, for example, a new conference creation control 505.

The user may input corresponding conference information in the input box of the second interface 501 shown in FIG. 5. For example, the user may input a monthly project progress report in the conference name input box 502 (for example, a "Please input a conference name" area) of the second interface 501 shown in FIG. 5, respectively input 21:30 on Oct. 8, 2020 and 22:30 on Oct. 8, 2020 in the start time and end time setting box 503 (for example, a "Start time" area and an "End time" area), and add participants A, B, and C in the participant adding box 504 (for example, tapping a "+" area).

S430: The first electronic device displays a third interface in response to receiving an operation performed by the user on the first control, where the third interface includes the conference information and a second control for creating an agenda arrangement list.

After the user inputs the information in the second interface 501 shown in FIG. 5, the user triggers a conference creation operation. For example, the user operates the new conference creation control 505 in the second interface 501. In this case, the first electronic device receives the conference creation operation triggered by the user, and sends a conference creation request to a server. The conference creation request carries the conference information. The conference information may include a conference name, a conference ID, a start time, an end time, participants, and the like. The server determines a duration of the conference based on the start time and the end time, fills the duration of the conference and the received conference information into a predetermined conference details interface template, and feeds back, to the first electronic device, interface information of a conference details interface carrying the conference information. The first electronic device displays a third interface. For example, the first electronic device displays a conference details interface 601 shown in FIG. 6. The conference details interface 601 displays the conference name (for example, the monthly project progress report), the conference ID (for example, 914164641), the start time (for example, 21:30 on Oct. 8, 2020), the end time (for example, 22:30 on Oct. 8, 2020), the participants (for example, A, B, and C), the duration (for example, 1 hour), a current status (for example, About to start), and a second control (for example, Agenda arrangement control) 603.

In one embodiment, the third interface may further include a third control (or referred to as a sharing control) for sharing the third interface. The user may operate the sharing control, so that the first electronic device sends the third interface to another electronic device. For example, the first electronic device and another electronic device may share the conference details interface by using the conferencing APP. Specifically, the user may operate a sharing control 602 shown in FIG. 6. The first electronic device sends the conference details interface 601 on the first electronic device to another electronic device in response to receiving the operation performed by the user on the sharing control 602, to notify another user, or enable the another user to edit the conference on the another electronic device. For an implementation in which the another user edits the conference on the another electronic device, refer to the following related content. Details are not described herein.

Certainly, the user may not operate the sharing control, nor share. For example, the user notifies the another user of the conference ID. After joining the conference, the another user may operate the conference details interface. In a specific time period before the conference, the another user may perform an operation. Alternatively, the user sets the conference details interface to be modifiable, so that the another user may perform modification.

It should be noted herein that S430 is an optional operation. That is, after S420 is performed, in response to receiving the operation performed by the user on the first control in the second interface, the following fourth interface in S440 may be directly displayed.

S440: The first electronic device requests, in response to receiving an operation performed by the user on the second control, the server to create an agenda arrangement list.

When the user operates the second control in the third interface, the first electronic device may request, in the following manners, the server to create an agenda arrangement list of the conference, which are specifically described as follows:

Manner 1:

S441*a*: The first electronic device displays a fourth interface in response to receiving the operation performed by the user on the second control, where the fourth interface includes an agenda arrangement area, and there is no agenda arrangement list in the agenda arrangement area.

The user operates the second control, and the display interface of the first electronic device jumps from the third interface to the fourth interface. For example, when the user taps the second control (for example, the agenda arrangement control) 603 in the third interface 601 shown in FIG. 6, the first electronic device receives the operation performed by the user on the agenda arrangement control, and sends an agenda arrangement request to the server. The agenda arrangement request carries the conference identifier. After receiving the agenda arrangement request, the server invokes, from a memory based on the conference identifier, conference information corresponding to the conference identifier, for example, information such as a conference subject, a conference duration, and participants, and loads the conference information into a predetermined agenda arrangement interface template. The server returns, to the first electronic device, the agenda arrangement interface template into which the conference information is loaded, and the first electronic device displays the agenda arrangement interface template. In this case, the display interface of the first electronic device includes the conference information and an agenda arrangement area in which there is no agenda arrangement list. For example, an agenda arrangement area 702*a* in an agenda arrangement interface 701*a* shown in FIG. 7*a* is a blank area. If the user wants to construct an agenda arrangement list, the user needs to create an agenda arrangement list in the agenda arrangement area 702*a*, and set configuration information for the agenda arrangement list, for example, configure an agenda template 703*a* for each agenda, configure a duration for each agenda, and configure a topic material for each agenda.

Further, the following several manners may be used to create the agenda arrangement list, which are specifically as follows:

First Manner:

S442*a*: The first electronic device displays a fifth interface in response to receiving an operation performed by the user in the fourth interface, where the fifth interface includes an agenda arrangement list of the conference, the agenda arrangement list of the conference is generated based on time of the conference and a preset agenda template, and the agenda arrangement list of the conference includes at least one topic.

In one embodiment, when the first electronic device receives an operation performed by the user in the fourth interface (for example, the agenda arrangement interface), the first electronic device sends a first request to the server. The first request carries the conference identifier. The server invokes, based on the conference identifier, the conference information corresponding to the conference identifier. The server determines, based on the conference information and a pre-stored correspondence between information and an agenda template, an agenda arrangement list corresponding to the conference information. The server feeds back the agenda arrangement list to the first electronic device. The first electronic device displays the agenda arrangement list in the agenda arrangement area of the agenda arrangement interface. For example, the user taps the agenda arrangement area in the agenda arrangement interface shown in FIG. 7*c*, and the first electronic device displays an agenda arrangement interface 702*b* shown in FIG. 7*b*. The agenda arrangement interface 702*b* presents an agenda arrangement list including an opening, a topic, a rest, and an ending.

In another embodiment, the agenda arrangement interface may further include a fourth control for adding an agenda arrangement list. The user may operate the fourth control, and a selection interface including at least one agenda arrangement list is displayed in the interface of the first electronic device for the user to select. For example, as shown in FIG. 7*d*, the user operates a list adding control 702*d* in an agenda arrangement interface 701*d*, and the interface of the first electronic device displays an agenda arrangement list adding interface 701*e* shown in FIG. 7*e*. The user may select, from the adding interface 701*e*, an agenda arrangement list 702*e* that needs to be added. In response to receiving an adding completion operation of the user (for example, the user taps a blank area in the selection interface), the first electronic device displays, in the agenda arrangement area, the agenda arrangement list selected by the user. In this way, in this embodiment of this application, the user can directly select an agenda arrangement list based on a requirement, so that the user requirement is met while the conference is quickly created.

In addition, to facilitate the user to change an agenda template of each agenda in the agenda arrangement list, the agenda arrangement interface further includes a fifth control (for example, a list selection/change control). The user may operate the list selection/change control for the first time, so that a list selection interface is displayed in the interface of the first electronic device. The user may select, in the list selection interface, an agenda to be changed in the agenda arrangement list. The user may operate the list selection/change control for the second time, so that a list change interface is displayed in the interface of the first electronic device. The user may select an agenda template in the list change interface. In response to receiving a completion operation of the user, the first electronic device requests the server to update the agenda template selected by the user to the agenda that needs to be changed in the agenda arrangement list.

Second Manner:

The fourth interface may further include at least one preset agenda template, and each preset agenda template corresponds to one agenda type. The agenda type of the preset agenda template may be blank, and may be subsequently set by the user based on an actual situation. Alternatively, the agenda type may be a predefined type, for example, an opening, a topic, a rest, or an ending. Certainly, the agenda type may alternatively be a user-defined type, and the user-defined agenda type needs to be determined based on a type of a conference subject. For example, the type of the conference subject is a study type, and correspondingly, the agenda template may include a project, an exercise, question answering, and the like. The type of the conference subject is a notification/report type, and correspondingly, the agenda template may include a subject 1, a subject 2, . . . , a subject n, and the like. The type of the conference subject is an entertainment type, and correspondingly, the agenda template may include a dance, a song, a sketch, a comic dialogue, and the like. Certainly, other examples may also be included, which are not listed one by one herein. The at least one preset agenda template may be used to create an agenda arrangement list, which is specifically described as follows:

S442*b*: Create an agenda arrangement list of a first conference in the agenda arrangement area of the fourth interface in response to receiving a first operation performed by the user on the preset agenda template.

The first operation may include a predetermined gesture operation. The predetermined gesture operation may include a tap operation, a double-tap operation, a touch and hold operation, a drag operation, a slide operation, or the like. Certainly, the first operation may further include another operation. This is not specifically limited in this embodiment of this application.

In one embodiment, the user may sequentially tap an agenda template and the agenda arrangement area in the agenda arrangement interface, and the selected agenda template is displayed in the selected agenda arrangement area, to construct an agenda arrangement list. For example, when the user taps an opening in an agenda arrangement interface 801 shown in FIG. 8, the first electronic device receives the tap operation performed by the user on the opening, selects the opening, and displays an identification box in an agenda arrangement area 802. When the user taps the identification box in the agenda arrangement area 802, the first electronic device receives the tap operation performed by the user on the identification box in the agenda arrangement area 802, presents the selected opening in the identification box, and renders the opening agenda. Similarly, operations on a topic, a rest, and an ending are the same as those described above. Finally, an agenda arrangement list including the opening, the topic, the rest, and the ending is obtained (as shown in FIG. 9).

In another embodiment, the user may select an agenda template in the agenda arrangement interface, and drag the selected agenda template to the agenda arrangement area, to construct an agenda arrangement list. For example, the user drags an agenda template in the agenda arrangement interface 801 shown in FIG. 8. When the user drags the opening in FIG. 8, the first electronic device identifies start position coordinates of a focus generated by a tap or press operation of the user, and determines an agenda template image, on which the start position coordinates are located, of the agenda arrangement interface 801, to determine an agenda template tapped by the user. In this case, the first electronic device sets the agenda template to be selected. A drag position of the selected agenda template is rendered in real time in the agenda arrangement interface. When the user releases the press operation, the first electronic device records end position coordinates of the focus, and determines whether the end position coordinates fall within an identification box of the conference arrangement area. If the end position coordinates fall within an identification box of the agenda arrangement area, the agenda template is presented in the identification box, and all conference agendas are re-rendered to obtain an agenda arrangement list (as shown in FIG. 9).

Certainly, the second manner may also include some embodiments of the first manner, and details are not described herein again.

Manner 2:

S441*b*: The first electronic device displays a sixth interface in response to receiving the operation performed by the user on the second control, where the sixth interface includes an agenda arrangement list of the conference, the agenda arrangement list of the conference is generated based on time of the conference and a preset agenda template, and the agenda arrangement list of the conference includes at least one topic.

As described above, the server may load the conference information and the preset agenda template into the predetermined agenda arrangement interface template, or the server may load the conference information and an agenda template corresponding to the conference information into the predetermined agenda arrangement interface template, and perform feedback to the first electronic device for display. A difference from the foregoing manner lies in that there is an agenda arrangement list in the agenda arrangement area displayed in the display interface of the first device (as shown in FIG. 7*b* and FIG. 7*c*). The agenda arrangement list is generated based on the time of the conference and the preset agenda template. The agenda arrangement list may include at least one agenda, and the agenda may be understood as a general term of a ritual and auxiliary activity and a topic during the conference. The at least one agenda may include at least one topic. For example, the agenda arrangement list may include agendas such as an opening, a topic, a rest, and an ending.

In embodiment, the agenda template corresponding to the conference may be a default agenda template (or referred to as a preset agenda template). That is, the server may load the preset agenda template into the predetermined agenda arrangement interface template to form an agenda arrangement list, and feed back the agenda arrangement list to the first electronic device for display. For example, an agenda arrangement list in an agenda arrangement area 702*b* of the agenda arrangement interface 702*b* shown in FIG. 7*b* includes agendas such as an opening, a topic, a rest, and an ending. The agenda arrangement list may be applied to a plurality of types of conferences.

In this way, in this embodiment of this application, the operation of creating the first conference by the user is received, the second interface is displayed, and the agenda arrangement list is displayed in the second interface, so that the agenda arrangement list is automatically generated. Subsequently, the user can create the conference by setting configuration information (such as an agenda template, a duration, a speaker, and a conference material) for each agenda. Therefore, in this embodiment of this application, a conference architecture is formed based on the conference information, and an agenda in the agenda arrangement list is edited and adjusted based on the formed conference architecture, thereby reducing conference creation operations and implementing quick conference creation.

In another embodiment, the agenda template corresponding to the conference may alternatively be determined based on conference content (for example, a subject name, a conference name, or a subject). That is, the server may determine, based on the conference information and a preset correspondence between content and a preset agenda template, the agenda template corresponding to the conference. The server loads the agenda template corresponding to the conference into the predetermined agenda arrangement interface template to form an agenda arrangement list. For example, it is assumed that a conference name is an online class. Correspondingly, an agenda template corresponding to the online class may include a project, an exercise, question answering, and the like. The server may load agenda templates such as the project, the exercise, and the question answering into the agenda arrangement interface template to form an agenda arrangement list. Then, the first electronic device may obtain an agenda arrangement interface 701*c* shown in FIG. 7*c*. An agenda arrangement list in an agenda arrangement area 702*c* of the agenda arrangement interface 701*c* may include the agendas such as the project, the exercise, and the question answering.

In this way, in this embodiment of this application, the content of the first conference that is input by the user in the first interface is received, the operation of creating the first conference by the user is received, and the agenda arrangement list related to the conference content is displayed in the second interface, so that an agenda arrangement list that is much related to the conference content can be generated based on an actual situation, which is more flexible and practical.

In the foregoing process of creating the agenda arrangement list, the server may configure a duration for each agenda in the agenda arrangement list based on first time of the conference. The first time may include at least one of a conference start time, a conference end time, and a conference duration. Specifically, the start time and the end time are used as an example for description, and the following several cases may be included:

In a first case, the server may determine a start time and an end time of a first agenda based on the start time of the conference and a preset duration of a preset agenda template corresponding to the first agenda. The server may determine a start time and an end time of a second agenda based on the end time of the first agenda and a preset duration of a preset agenda template corresponding to the second agenda. The rest can be deduced by analogy. Alternatively, the server may pre-configure time for preset agenda templates. The time configured for the preset agenda templates may be the same or different. For example, the opening is set to 5 minutes by default and the topic is set to 10 minutes. Alternatively, all agenda templates are set to 10 minutes.

For example, it is assumed that the time of the conference is 21:30 to 22:30, the preset duration of the preset agenda template corresponding to the first agenda is 15 min, and the preset duration of the preset agenda template corresponding to the second agenda is 30 min. In this case, time occupied by the first agenda is 21:30 to 21:45, time occupied by the second agenda is 21:45 to 22:15, and so on.

In a second case, the server may determine the duration of the conference based on the start time and the end time of the conference. The server determines a duration of each agenda based on the duration of the conference and a quantity of agendas in the agenda arrangement list. For example, the server may evenly allocate the conference time to each agenda based on the quantity of agendas in the agenda arrangement list. For example, it is assumed that the time of the conference is 21:30 to 22:30. If the agenda arrangement list includes two agendas: an opening and a topic, time occupied by the opening agenda is 21:30 to 22:00, and time occupied by the topic agenda is 22:00 to 22:30. If the agenda includes three agendas: an opening, a topic, and a rest, the time of 21:30 to 22:30 is evenly allocated to the three agendas.

In a third case, the server may determine a duration of a second agenda based on the start time and the end time of the conference, a configured duration of a first agenda template, and a quantity of agendas corresponding to another agenda template other than the first agenda template.

For example, it is assumed that the time of the conference is 21:30 to 22:30, a duration configured for an opening is 5 min, and a quantity of agendas of a topic type is 5. In this case, time occupied by the opening agenda is 21:30 to 21:35, and a time period of 21:36 to 22:35 is evenly allocated to the five agendas of the topic type.

Certainly, there may be other time configuration manners, which are not listed one by one in this embodiment of this application.

Further, after the agenda arrangement list is obtained by using the foregoing embodiment, configuration information may be further set for each agenda in the agenda arrangement list. The configuration information may include at least one of the following: a name, a material, a duration, a sequence number, and speaker information. Therefore, the conference creation method provided in this embodiment of this application further includes:

S450: The first electronic device requests, in response to receiving an operation performed by the user on the agenda arrangement list, the server to modify configuration information of an agenda in the agenda arrangement list.

As described above, the agenda arrangement list in the agenda arrangement area may be automatically generated, or may be constructed by the user. The user may set the agenda arrangement list in the agenda arrangement area. For example, the user may operate each agenda in the agenda arrangement list by using a predefined gesture, to complete setting of each agenda separately. For example, when the user operates a topic 1 shown in FIG. 9, the first electronic device receives the operation performed by the user on the topic 1, and displays a drop-down list 1020 shown in FIG. 10. The drop-down list 1020 includes options such as edit, move up, move down, and delete. When the user selects the edit option, in response to receiving the operation performed by the user on the edit option, the first electronic device displays an editing interface 112 of the topic 1 shown in FIG. 11. The editing interface 112 may include name, time, speaker, and other information input boxes. When the user respectively inputs a monthly report of a project A, 20 min, and Zhang San in the information input boxes, the first electronic device uploads, to the server, an electronic device identifier and the information input by the user. After receiving the information, the server checks a right of the electronic device based on the electronic device identifier. When determining that the first electronic device has no editing right, the server generates prompt information. The prompt information prompts the user that the user has no operation right. When determining that the first electronic device has an editing right, the server stores the information, and displays the information in an identification box of the topic 1 (as shown in FIG. 12).

The input time of the agenda may be understood as a duration of the agenda. If the server presets both an opening agenda and an ending agenda to 10 minutes by default, and presets a rest agenda to 5 minutes by default, a remaining duration is evenly allocated to the topic 1 and a topic 2, that is, the topic 1 and the topic 2 each have 17.5 minutes. After the user inputs 20 min in the time input box, the server changes the duration of the topic 1 to 20 min, and changes the duration of the topic 2 to 15 min at the same time. The server feeds back the changed information to the first electronic device, and the first electronic device displays an interface 121 shown in FIG. 12.

Certainly, the editing interface may further include a topic summary, conference file, and other controls. When the user operates the topic summary control, the first electronic device displays a topic summary interface for the user to edit a topic summary. When the user operates the conference file control, the first electronic device may display a file selection interface for the user to select and upload a conference file on the first electronic device.

Certainly, in addition to the foregoing input manner, for speaker or conference file information inputting, the user may use other manners. For speaker information inputting, the user may drag a profile picture of an invited first participant to the identification box of the topic 1 by dragging, taping, or the like. The first participant is a speaker of the topic 1. For conference file inputting, the user may tap a conference file, or drag an uploaded conference file to the identification box of the topic 1. For name inputting, the first electronic device may consider by default that a name of the speaker is the name of the topic 1, or may consider by default that a name of the conference file is the name of the topic 1, or may consider by default that a sequence number of the topic 1 is the name of the topic 1. This may be specifically limited based on an actual situation.

In this embodiment of this application, after the agenda arrangement list is presented in the agenda arrangement area in the agenda arrangement interface, the user may operate an agenda in the agenda arrangement list, to implement agenda deletion, movement, addition, modification, and the like, to construct a conference framework that meets an intention of the user.

To control or make a reminder of a duration of each agenda in a conference process, an embodiment of this application further provides a conference control method. The following describes in detail the conference control method provided in this embodiment of this application.

FIG. 13*a* is a schematic flowchart of a conference control method according to an embodiment of this application. As shown in FIG. 13*a*, the method includes the following operations.

S1310: A first electronic device joins a conference, where an agenda arrangement list of the conference includes at least one agenda.

A user logs in to a conferencing APP on the first electronic device, and the first electronic device displays a conference login interface. The user inputs a conference ID in a conference ID input box of the conference login interface. The first electronic device sends a conference request to a server. The conference request carries the conference ID. The server performs verification on the conference ID. After the verification succeeds, the server adds an electronic device identifier of the first electronic device to a conference corresponding to the conference ID. In addition, the server performs rights check on the first electronic device, to identify a right (a participant right, a speaker right, or a moderator right) of the first electronic device, reads conference information based on the right of the first electronic device, and feeds back the conference information to the first electronic device. The first electronic device renders a corresponding graphics module based on the conference information and displays the graphics module in an application interface.

Because the moderator right may include a control right, a logic processing layer may bind a user interaction and response function in a user interaction layer to a corresponding function of each conference module, to implement a corresponding operation on a conference agenda, for example, switching to a next topic or suspending a current conference. For example, the switching to a next topic is used as an example. A moderator taps a switching control displayed in an interface of the first electronic device. The user interaction layer of the electronic device generates an agenda switching instruction in response to receiving the tap operation of the moderator, and transmits the agenda switching instruction to a conference progress control module of the logic processing layer. The conference progress control module performs, according to the agenda switching instruction, the switching operation of switching to a next agenda, to switch from a current topic to a next topic.

Because the speaker right may include a control right of a current topic, the logic processing layer may bind the user interaction and response function in the user interaction layer to a corresponding function of each conference module, to implement a corresponding operation on the topic, for example, switching to a next topic, or presenting a topic material. For example, the presenting a topic material is used as an example. When a speaker drags a topic material to a conference picture, an in-conference file presentation and interaction module in the user interaction layer of the first electronic device supports the user in operating (for example, dragging) the conference material, places the conference material in the conference picture, and transfers information about the conference material operated by the user to a topic file uploading and rights management module of the logic processing layer. The topic file uploading and rights management module receives conference material file information of a current topic that is transferred by the user interaction layer, establishes a rights relationship between the file, the user, and the topic, and sends the information to a data storage layer for storage. The in-conference file presentation and interaction module in the user interaction layer is bound to the conference material of the current topic by using a topic file uploading module of a logic layer, to present content of the file material to all participants.

S1320: The first electronic device displays a first interface of a first agenda in the at least one agenda of the conference, where the first interface includes a progress axis of the first agenda, and the progress axis is used to represent an actual duration of the first agenda and a planned duration of the first agenda.

The first electronic device accesses the conference, and the conference may start when a conference start time comes. After the conference starts, the first electronic device determines, based on the agenda arrangement list of the conference and first time, a first agenda performed at the first time, and displays a first interface (or referred to as a first conference interface) of the first agenda. For example, when the conference starts, an agenda performed is an opening agenda according to the agenda arrangement list. In this case, a display interface of the first electronic device is an opening interface.

The first electronic device displays different agenda interfaces based on different agendas. The conference interface includes a main picture area and a management area. The main picture area is used to display an interface of a current agenda. If a speaker of the current agenda is sharing a conference material, the conference material shared from the speaker is displayed in the main picture area. The management area is used to display a name, the speaker, a duration progress axis, and a video view of the current agenda. The information helps participants understand content of the current agenda.

In addition, the agenda interface displayed on the first electronic device varies with different rights of the first electronic device. For example, the right of the first electronic device is the participant right. FIG. 13*b* is a schematic diagram of a conference interface 131 displayed on a first electronic device according to an embodiment of this application. A main picture area 132 displays a picture of a current agenda. A management area 133 displays a name, a speaker, a duration progress axis 134, and a video view of the current agenda.

The right of the first electronic device is the moderator right. The moderator mainly uses the management area to ensure normal running of the conference. Therefore, in addition to displaying the name, the speaker, the duration progress axis, the video view, and the like of the current agenda that are shown in FIG. 13*b*, the management area of the first electronic device may further include a duration editing control. The moderator may operate the duration editing control to adjust a duration of the current agenda. Example 1: The first electronic device displays an editing interface in response to receiving a tap performed by the moderator on the duration editing control. When receiving an operation performed by the user on a "+" control in the editing interface, the first electronic device sends a duration extension request to the server, and the server extends the duration of the current agenda based on the duration extension request. Similarly, when receiving an operation performed by the user on a "–" control in the editing interface, the first electronic device shortens the duration of the current agenda. Example 2: In response to receiving a drag performed by the moderator on the duration editing control to the right, the first electronic device sends a duration extension request to the server, and the server extends the duration of the current agenda based on the duration extension request. Similarly, in response to receiving a drag performed by the moderator on the duration editing control to the left, the first electronic device sends a duration shortening request to the server, and the server shortens the duration of the current agenda based on the duration shortening request.

The management area may further include a time reminder control 145 shown in FIG. 14. The moderator may operate the time reminder control to make a reminder of remaining time of the current agenda. For example, in response to receiving a tap performed by the moderator on the time reminder control, the first electronic device sends a time obtaining request to the server. The server obtains a remaining duration of the current agenda based on the time obtaining request, and sends a remaining duration reminder notification to the first electronic device, for example, reminding a speaker of 10 minutes remaining for speaking, or reminding participants of 10 minutes remaining for the current agenda.

The management area may further include a switching control 146 shown in FIG. 14. The moderator may operate the switching control to switch from the current agenda to a next agenda. For example, when a current speaker finishes speaking normally, or the current speaker finishes speaking earlier, or another exception occurs (for example, an electronic device of the current speaker is faulty), the moderator may tap the switching control, so that the first electronic device sends a switching request to the server, and the server switches from a current agenda to a next agenda based on the switching request, and perform feedback to the first electronic device.

The management area may further include a file-associated area (for example, a file 1 shown in FIG. 14) 144 shown in FIG. 14. The file-associated area 144 is used to place a conference file uploaded in advance. When the speaker or the moderator needs to share the file, the speaker or the moderator may drag the file in the file-associated area to the main picture area for display, thereby saving time for searching for the file.

The file-associated area may further include an adding control. When the speaker or the moderator operates the adding control, the first electronic device displays a file adding interface. In response to receiving a selection operation of the speaker or the moderator, the first electronic device adds a selected file to the file-associated area. In this way, the moderator or the speaker can add or share another speaking material.

The right of the first electronic device is the speaker right. The speaker mainly uses the management area to control a current agenda to end. Therefore, in addition to displaying the name, the speaker, the duration progress axis, the video view, the file-associated area, and the like of the current agenda that are shown in FIG. 13*b* and FIG. 14, the management area may further include an end speaking control 156 shown in FIG. 15. The speaker may operate the end speaking control 156 to end the current agenda. For example, in response to receiving an operation performed by the speaker on the end speaking control, the first electronic device sends an end request to the server. The server ends the current agenda based on the end request, changes the right of the first electronic device to the participant right, and feeds back an interface corresponding to the participant right to the first electronic device for display.

S1330: The first electronic device requests the server to adjust the planned duration of the first agenda when the actual duration of the first agenda is not equal to the planned duration of the first agenda.

The "adjust the planned duration of the first agenda" may be understood as manually adjusting the planned duration of the first agenda, or automatically adjusting the planned duration of the first agenda.

The following separately describes different cases in detail.

In a first case, when the actual duration of the first agenda is greater than the planned duration of the first agenda, the duration progress axis in the first conference interface of the first agenda that is displayed on the first electronic device presents a first segment and a second segment, the first segment is the planned duration of the first agenda, and the second segment is a time difference between the actual duration of the first agenda and the planned duration of the first agenda.

Specifically, the following manners may be used for implementation:

A first manner is to keep the planned duration of the agenda unchanged and ensure that a total duration of the conference remains unchanged.

When the actual duration of the first agenda is greater than the planned duration of the first agenda, the first agenda runs overtime. In this case, the first electronic device determines the time difference between the actual duration of the first agenda and the planned duration of the first agenda, and renders a shading of the time difference in a color different from that of a shading of the planned duration of the first agenda. For example, the first electronic device displays a duration progress axis shown in FIG. 16 in the first conference interface of the first agenda (for example, a topic 1). A first segment of the duration progress axis is the planned duration of the first agenda, and presents a gray pattern. A second segment of the duration progress axis is the time difference (that is, a duration occupied from a second agenda (for example, a topic 2)) between the actual duration of the first agenda and the planned duration of the first agenda, and presents a diagonal pattern.

When the user operates the second segment of the duration progress axis, the first electronic device receives the operation performed by the user on the duration progress axis, and sends an information obtaining request to the server. The information obtaining request carries time of the second segment. The server obtains, based on the information obtaining request, the second agenda corresponding to a planned duration in which the time of the second segment is located, and reads information about the second agenda. The server returns the information about the second agenda to the first electronic device, and the first electronic device displays the information about the second agenda. For example, when the user moves a mouse cursor to the second segment of the duration progress axis, the first conference interface of the first agenda on the first electronic device displays the information about the second agenda.

After a speaker of the first agenda finishes speaking, when the speaker operates the end speaking control or the moderator switches to a next agenda, the first electronic device sends a switching request to the server, and the server switches to the next agenda, that is, the second agenda, based on the switching request. The first electronic device displays a second conference interface of the second agenda. In this case, the first electronic device renders the shading of the duration occupied by the first agenda (for example, the second segment of the duration progress axis of the first agenda) in a color the same as that of a shading of a time difference between the planned duration of the second agenda and the duration occupied by the first agenda. For example, the first electronic device displays a duration progress axis shown in FIG. 17 in the second conference interface of the second agenda (for example, the topic 2). A first segment of the duration progress axis is the duration occupied by the first agenda (for example, the topic 1), and a second segment of the duration progress axis is the time difference between the planned duration of the second agenda (for example, the topic 2) and the duration occupied by the first agenda.

Certainly, there may be a same duration progress axis in agenda interfaces displayed on the first electronic device. The duration progress axis presents time nodes of each agenda. When an agenda runs overtime, time of a next agenda adjacent to the agenda is occupied. This is displayed in a differentiated manner in the duration progress axis. For details, refer to the foregoing description. Details are not described herein again.

In conclusion, a speaker of each agenda may adjust a speaking tempo based on a duration progress axis, and time of each agenda is flexibly adjusted while it is ensured that the total duration of the conference remains unchanged.

The second manner is to change the planned duration of the agenda and the total duration of the conference.

The planned duration of the agenda may be specifically adjusted in following manners:

Manner 1: The planned duration of the first agenda is adjusted in real time.

When the actual duration of the first agenda is greater than the planned duration of the first agenda, the first agenda runs overtime. In this case, the first electronic device may upload the actual duration of the first agenda to the server in real time. The server receives the actual duration of the first agenda that is uploaded by the first electronic device, and assigns the actual duration of the first agenda to the planned duration of the first agenda. For example, the planned duration of the first agenda is 10 min. When the actual duration of the first agenda is greater than 10 min, the planned duration of the first agenda is updated in real time, for example, 10 min and 1 s, 10 min and 2 s, 10 min and 3 s, . . . .

Manner 2: Different from Manner 1, the planned duration of the first agenda is periodically adjusted.

When the actual duration of the first agenda is greater than first planned duration of the first agenda, the first electronic device sends a first time adjustment request to the server. The first time adjustment request carries an adjustment time interval. The server adjusts a first planned duration of the first agenda to a second planned duration based on the first time adjustment request. The second planned duration is a sum of the first planned duration and the adjustment time interval. For example, the first planned duration of the first agenda is 10 min, and adjustment is performed at an interval of 30*s*. Specifically, when the actual duration of the first agenda is greater than the first planned duration of the first agenda, the first electronic device sends a first time adjustment request to the server, and the server adjusts the planned duration of the first agenda based on the first time adjustment request, to obtain a second planned duration of 10.5 min. When the actual duration of the first agenda is greater than the second planned duration of the first agenda, the first electronic device sends a second time adjustment request to the server, and the server adjusts the planned duration of the first agenda based on the second time adjustment request, to obtain a third planned duration of 11 min. The rest can be deduced by analogy.

Manner 3: The planned duration of the first agenda is manually adjusted.

In a first embodiment, the moderator or the speaker actively adjusts the duration of the agenda. As described above, the moderator and the speaker have a time editing right. Display interfaces of electronic devices of the moderator and the speaker include a duration editing control. For example, the user of the first electronic device is the moderator. The display interface (as shown in FIG. 18) of the first electronic device includes a duration editing control. In response to receiving an operation performed by the moderator on the duration editing control, the first electronic device displays a duration modification window 1802 shown in FIG. 18. Prompt information displayed in the window 1802 prompts the moderator to "Please input a conference duration". The moderator inputs an adjusted duration in the duration modification window. The first electronic device uploads the adjusted duration to the server. The server receives the adjusted duration, and assigns the duration to the planned duration of the first agenda. For example, as shown in FIG. 19, an initial specified value of the planned duration of the first agenda (for example, the topic 1) is 10 min, the moderator inputs 15 min in the duration modification window, the first electronic device uploads 15 min to the server, and the server assigns 15 min to the planned duration of the first agenda.

In a second embodiment, a difference from the first embodiment lies in that prompt information displayed in the duration modification window prompts the moderator to "Please input an added duration". The moderator inputs an added duration in the duration modification window. The first electronic device uploads the added duration to the server. The server receives the added duration, adds the added duration and a first planned duration of the first agenda to obtain a second planned duration, and assigns the second planned duration to the planned duration of the first agenda. For example, as shown in FIG. 20, an initial specified value of the planned duration of the first agenda (for example, the topic 1) is 10 min, the moderator inputs 5 min in the duration modification window, the first electronic device uploads 5 min to the server, and the server assigns a sum of the added 5 min and the initial specified value 10 min of the planned duration to the planned duration of the first agenda. In this case, a changed planned duration of the first agenda is 15 min.

As described above, when the planned duration of the first agenda is adjusted, or a planned duration of another agenda is adjusted, the total duration of the conference is adjusted correspondingly.

The third manner is to change the planned duration of the agenda, but not the total duration of the conference.

In one embodiment, when the actual duration of the first agenda is greater than the planned duration of the first agenda, the first electronic device uploads the actual duration of the first agenda to the server. The server receives the actual duration of the first agenda, and assigns the actual duration of the first agenda to the planned duration of the first agenda. The server determines a second agenda whose weight is less than a threshold and a planned duration of the second agenda. The server determines a time difference between the actual duration of the first agenda and the planned duration of the first agenda, and assigns a difference between an initial value of the planned duration of the second agenda and the time difference to the planned duration of the second agenda.

In this way, in this embodiment of this application, conference time may be effectively allocated based on a real-time status, and more conference time is allocated to an agenda with a larger weight. That is, when an agenda has time remaining during the conference, the remaining time is preferentially allocated to an agenda with a high priority. Similarly, when an agenda lacks time during the conference, time may be taken from an agenda with a lower priority (for example, time of a rest is occupied).

In another embodiment, it is assumed that the agenda arrangement list includes n agendas, where n is a positive integer greater than or equal to 2. When an actual duration of an $(n-1)^{th}$ agenda is greater than a planned duration of the $(n-1)^{th}$ agenda, as described above, the server may assign the actual duration of the $(n-1)^{th}$ agenda to the planned duration of the $(n-1)^{th}$ agenda, and keep time (including a start time and an end time) of the last agenda in the n agendas unchanged.

In a second case, when the actual duration of the first agenda is less than the planned duration of the first agenda, the duration progress axis in the first conference interface of the first agenda that is displayed on the first electronic device presents a first segment and a second segment, the first segment is the actual duration of the first agenda, and the second segment is a time difference between the actual duration of the first agenda and the planned duration of the first agenda.

Specifically, the following manners may be used for implementation:

A first manner is to keep the planned duration of the agenda unchanged and ensure that a total duration of the conference remains unchanged.

When the actual duration of the first agenda is less than the planned duration of the first agenda, the first agenda ends earlier, and the first electronic device determines the time difference between the actual duration of the first agenda and the planned duration of the first agenda. For example, the first electronic device displays a duration progress axis shown in FIG. 21 in the first conference interface of the first agenda. A first segment of the duration progress axis is the actual duration of the first agenda, and presents a gray pattern. The second segment of the duration progress axis is the time difference between the actual duration of the first agenda and the planned duration of the first agenda, and also presents a gray pattern.

When the user operates the second segment of the duration progress axis, the first electronic device receives the operation performed by the user on the duration progress axis, and sends an information obtaining request to the server. The information obtaining request carries time of the second segment. The server obtains, based on the information obtaining request, the second agenda corresponding to a planned duration in which the time of the second segment is located, and reads information about the second agenda. The server returns the information about the second agenda to the first electronic device, and the first electronic device displays the information about the second agenda. For example, when the user moves a mouse cursor to the second segment of the duration progress axis, the first conference interface of the first agenda on the first electronic device displays the information about the second agenda.

After a speaker of the first agenda finishes speaking, when the speaker operates the end speaking control or the moderator switches to a next agenda, the first electronic device sends a switching request to the server, and the server switches to the next agenda, that is, the second agenda, based on the switching request. The first electronic device displays a second conference interface of the second agenda. In this case, the first electronic device renders a shading of a remaining duration (for example, the second segment of the duration progress axis of the first agenda) of the first agenda in a color different from that of a shading of the planned duration of the second agenda. For example, the first electronic device displays a duration progress axis shown in FIG. 22 in the second conference interface of the second agenda. A first segment of the duration progress axis is the remaining duration of the first agenda, and presents a gray pattern. A second segment of the duration progress axis is the planned duration of the second agenda, and presents a diagonal pattern.

For example, the planned duration of the first agenda is 10 min, and the actual duration of the first agenda is 8 min. In this case, the remaining duration of the first agenda is 2 min. After the speaker of the first agenda finishes speaking, when the speaker operates the end speaking control or the moderator switches to a next agenda (that is, the second agenda), the second agenda inherits the remaining duration of the first agenda. When the first electronic device displays the second conference interface of the second agenda, the first segment and the second segment in the duration progress axis displayed in the second conference interface are rendered in different colors. The first segment is the remaining duration of the first agenda, and the second segment is the planned duration of the second agenda. In this way, a speaker of the second agenda is allocated 2 min more.

Certainly, there may be a same duration progress axis in agenda interfaces displayed on the first electronic device. The duration progress axis presents time nodes of each agenda. When an agenda ends earlier, there is a duration remaining. This is displayed in a differentiated manner in the duration progress axis. For details, refer to the foregoing description. Details are not described herein again.

In conclusion, a speaker of each agenda may adjust a speaking tempo based on a duration progress axis, and time of each agenda is flexibly adjusted while it is ensured that the total duration of the conference remains unchanged.

The second manner is to change the planned duration of the agenda and the total duration of the conference.

The planned duration of the agenda may be specifically adjusted in following manners:

Manner 1: The planned duration of the first agenda is adjusted.

When the actual duration of the first agenda is less than the planned duration of the first agenda, the first electronic device may upload the actual duration of the first agenda to the server. The server receives the actual duration of the first agenda uploaded by the first electronic device, and assigns the actual duration of the first agenda to the planned duration of the first agenda. For example, assuming that the actual duration of the first agenda is 8 min, the planned duration of the first agenda is 10 min, and the actual duration of the first agenda is less than the planned duration of the first agenda, the server updates the planned duration of the first agenda to 8 min.

Manner 2: The planned duration of the first agenda is manually adjusted.

In a first embodiment, the moderator or the speaker actively adjusts the duration of the agenda. As described above, the moderator and the speaker have a time editing right. Display interfaces of electronic devices of the moderator and the speaker include a duration editing control. For example, the user of the first electronic device is the moderator. The display interface of the first electronic device includes a duration editing control. In response to receiving an operation performed by the moderator on the duration editing control, the first electronic device displays a duration modification window shown in FIG. 18. Prompt information displayed in the window prompts the moderator to "Please input a conference duration". The moderator inputs an adjusted duration in the duration modification window. The first electronic device uploads the adjusted duration to the server. The server receives the modified duration, and assigns the duration to the planned duration of the first agenda. For example, an initial specified value of the planned duration of the first agenda is 10 min, the moderator inputs 8 min in the duration modification window, the first electronic device uploads 8 min to the server, and the server assigns 8 min to the planned duration of the first agenda.

In a second embodiment, a difference from the first embodiment lies in that prompt information displayed in the duration modification window prompts the moderator to "Please input a subtracted duration". The moderator inputs a subtracted duration in the duration modification window. The first electronic device uploads the subtracted duration to the server. The server receives the subtracted duration, subtracts the subtracted duration from a first planned duration of the first agenda to obtain a second planned duration, and assigns the second planned duration to the planned duration of the first agenda.

As described above, when the planned duration of the first agenda is adjusted, or a planned duration of another agenda is adjusted, the total duration of the conference is adjusted correspondingly.

The third manner is to change the planned duration of the agenda, but not the total duration of the conference.

In one embodiment, when the actual duration of the first agenda is less than the planned duration of the first agenda, the first electronic device uploads the actual duration of the first agenda to the server. The server receives the actual duration of the first agenda, and assigns the actual duration of the first agenda to the planned duration of the first agenda. The server determines a second agenda whose weight is greater than the threshold and a planned duration of the second agenda. The server determines the time difference between the actual duration of the first agenda and the planned duration of the first agenda, and assigns a sum of an initial value of the planned duration of the second agenda and the time difference to the planned duration of the second agenda.

In another embodiment, it is assumed that the agenda arrangement list includes n agendas, where n is a positive integer greater than or equal to 2. When an actual duration of an $(n-1)^{th}$ agenda is less than a planned duration of the $(n-1)^{th}$ agenda, as described above, the server may assign the actual duration of the $(n-1)^{th}$ agenda to the planned duration of the $(n-1)^{th}$ agenda, and keep time (including a start time and an end time) of the last agenda in the n agendas unchanged.

FIG. 23 is a schematic diagram of a structure of another electronic device according to an embodiment of this application. As shown in FIG. 23, the electronic device 2300 includes:

- a first display unit 2310, configured to display a first interface of a conferencing application, where the first interface is used to create a first conference;
- a first receiving unit 2320, configured to receive first time of the first conference that is input by a user in the first interface, and receive an operation of creating the first conference by the user; and
- a second display unit 2330, configured to display a second interface in response to receiving the operation of creating the first conference by the user. The second interface includes an agenda arrangement list of the first conference, the agenda arrangement list of the first conference is generated based on the first time of the first conference and a preset agenda template, and the agenda arrangement list of the first conference includes at least one topic.

Further, the electronic device 2300 further includes:

- a second receiving unit 2340, configured to receive content of the first conference that is input by the user in the first interface.

The agenda arrangement list of the first conference is generated based on the first time of the first conference, the content of the first conference, and a preset correspondence between content and an agenda template.

Further, the second interface further includes a first control, and the electronic device 2300 further includes:

- a third display unit 2350, configured to display a third interface in response to receiving an operation performed by the user on the first control, where the third interface includes at least one second control and at least one agenda arrangement list, and each agenda arrangement list corresponds to one second control; and
- a fourth display unit 2360, configured to display, in the second interface in response to receiving an operation of selecting a target second control from the at least one second control by the user, an agenda arrangement list corresponding to the target second control as the agenda arrangement list of the first conference.

Further, time of each agenda in the agenda arrangement list of the first conference is determined based on the first time of the first conference, an agenda template of the preset agenda template, and a correspondence between a preset agenda template and a preset duration.

Further, the first time includes at least one of a conference start time, a conference end time, and a conference duration.

Further, the second interface further includes a third control, and the electronic device 2300 further includes:

- a sending unit 2370, configured to request, in response to receiving an operation performed by the user on the third control, a server to share the second interface with another device.

In this way, in this embodiment of this application, the operation of creating the first conference by the user is received, the second interface is displayed, and the agenda arrangement list is displayed in the second interface, so that the agenda arrangement list is automatically generated. Subsequently, the user can create the conference by setting configuration information (such as an agenda template, a duration, a speaker, and a conference material) for each agenda. Therefore, in this embodiment of this application, a conference architecture is formed based on conference information, and an agenda in the agenda arrangement list is edited and adjusted based on the formed conference architecture, thereby reducing conference creation operations and implementing quick conference creation.

FIG. 24 is a schematic diagram of a structure of another electronic device according to an embodiment of this application. As shown in FIG. 24, the electronic device 2400 includes:

- a first display unit 2410, configured to display a first interface of a conferencing application, where the first interface is used to create a first conference;
- a receiving unit 2420, configured to receive first time of the first conference that is input by a user in the first interface, and receive an operation of creating the first conference by the user;
- a second display unit 2430, configured to display a second interface in response to receiving the operation of creating the first conference by the user, where the second interface includes at least one preset agenda template and an agenda arrangement area; and
- a creation unit 2440, configured to create an agenda arrangement list of the first conference in the agenda arrangement area based on the first time of the first conference in response to receiving a first operation performed by the user on the preset agenda template.

Further, the creation unit 2440 is further configured to:

display at least one identification box in the agenda arrangement area in response to receiving a first operation performed by the user on a first preset agenda template in the at least one preset agenda template; and display, in response to a second operation performed by the user on a first identification box in the at least one identification box, the first preset agenda template in the first identification box.

Further, the first operation includes a single-tap operation, a double-tap operation, a drag operation, a touch and hold operation, or a slide operation.

Further, the first operation includes the drag operation; and the creation unit 2440 is further configured to display the first preset agenda template in the first identification box when it is detected that the user drags the first preset agenda template to the first identification box.

Further, time of each agenda in the agenda arrangement list of the first conference is determined based on the time of the first conference, a preset agenda template corresponding to each agenda in the agenda arrangement list, and a correspondence between a preset agenda template and a preset duration.

Further, the first time includes at least one of a conference start time, a conference end time, and a conference duration.

Further, the electronic device 2400 further includes:

a modification unit 2450, configured to modify configuration information of each agenda in the agenda arrangement list in response to receiving an operation performed by the user on each agenda in the agenda arrangement list of the first conference.

Further, the configuration information includes at least one of the following: a name, a material, a duration, a sequence number, and speaker information.

Further, the second interface further includes a first control, and the electronic device 2400 further includes:

a third display unit 2460, configured to display a third interface in response to receiving an operation performed by the user on the first control, where the third interface includes at least one second control and at least one agenda arrangement list, and each agenda arrangement list corresponds to one second control; and a fourth display unit 2470, configured to display, in the second interface in response to receiving an operation of selecting a target second control from the at least one second control by the user, an agenda arrangement list corresponding to the target second control as the agenda arrangement list of the first conference.

Further, the second interface further includes a third control, and the electronic device 2400 further includes:

a sending unit 2480, configured to request, in response to receiving an operation performed by the user on the third control, a server to share the second interface with another device.

In this way, in this embodiment of this application, the operation of creating the first conference by the user is received, the second interface is displayed, and the at least one preset agenda template and the agenda arrangement area are displayed in the second interface. The agenda arrangement list of the first conference is created in the agenda arrangement area based on the first time of the first conference in response to receiving the first operation performed by the user on the preset agenda template. For example, the user may drag a preset agenda template to the agenda arrangement area to generate an agenda, thereby completing creation of the agenda arrangement list. Subsequently, the user can create the conference by setting configuration information (such as an agenda template, a duration, a speaker, and a conference material) for each agenda. Therefore, in this embodiment of this application, a conference architecture is formed based on conference information, and an agenda in the agenda arrangement list is edited and adjusted based on the formed conference architecture, thereby reducing conference creation operations and implementing quick conference creation.

FIG. 25 is a schematic diagram of a structure of another electronic device according to an embodiment of this application. As shown in FIG. 25, the electronic device 2500 includes:

a join unit 2510, configured to join a first conference, where an agenda arrangement list of the first conference includes at least one agenda;

a first display unit 2520, configured to display a first interface of a first agenda in the at least one agenda, where the first interface includes a progress axis of the first agenda, and the progress axis is used to represent an actual duration of the first agenda and a planned duration of the first agenda; and an adjustment unit 2530, configured to request a server to adjust the planned duration of the first agenda when the actual duration of the first agenda is not equal to the planned duration of the first agenda.

Further, the adjustment unit 2530 is further configured to:

upload the actual duration of the first agenda to the server when the actual duration of the first agenda is not equal to the planned duration of the first agenda. The server is configured to assign the actual duration of the first agenda to the planned duration of the first agenda.

Further, the adjustment unit 2530 is further configured to:

display a second interface in response to receiving an operation performed by a user on a first control, where the second interface includes a duration modification box;

receive a first duration input by the user in the duration modification box; and upload the first duration to the server. The server is further configured to assign the first duration to the planned duration of the first agenda, or the server is further configured to assign a sum of the first duration and an initial value of the planned duration of the first agenda to the planned duration of the first agenda.

Further, the adjustment unit 2530 is further configured to:

upload a time difference between the actual duration of the first agenda and the planned duration of the first agenda to the server when the actual duration of the first agenda is not equal to the planned duration of the first agenda.

When the time difference is a negative number, the server is configured to: determine a second agenda whose weight is greater than a first threshold, and assign a sum of a value of the time difference and an initial value of a planned duration of the second agenda to the planned duration of the second agenda.

When the difference is a positive number, the server is configured to: determine a third agenda whose weight is less than the first threshold, and assign an initial value of a planned duration of the third agenda subtracted by a value of the time difference to the planned duration of the third agenda.

Further, a quantity of the at least one agenda is n, and n is a positive integer greater than or equal to 2. The adjustment unit 2530 is further configured to:

when the actual duration of the first agenda is not equal to the planned duration of the first agenda, perform an operation of keeping time of the last agenda in the n agendas unchanged.

Further, the progress axis of the first agenda includes a first segment and a second segment, the first segment is used to represent the planned duration of the first agenda or the actual duration of the first agenda, and the second segment is used to represent the time difference between the planned duration of the first agenda and the actual duration of the first agenda. The electronic device 2500 further includes:

a second display unit 2540, configured to: when the actual duration of the first agenda is not equal to the planned duration of the first agenda, display the first segment and the second segment of the progress axis of the first agenda in a differentiated manner.

Further, the first interface further includes a second control for switching between agendas, and the electronic device 2500 further includes:

a third display unit 2550, configured to display a second interface of the second agenda of the first conference in response to receiving an operation performed by the user on the second control. The second interface includes a progress axis of the second agenda, and the progress axis is used to represent an actual duration of the second agenda and the planned duration of the second agenda.

Further, the progress axis of the second agenda includes a first segment and a second segment, the first segment is used to represent the time difference between the planned duration of the first agenda and the actual duration of the first agenda, and the second segment is used to represent the planned duration of the second agenda. The electronic device 2500 further includes:

a fourth display unit 2560, configured to: when the actual duration of the first agenda is not equal to the planned duration of the first agenda, display the first segment and the second segment of the progress axis of the second agenda in a differentiated manner.

Further, the first interface further includes an exhibition area and a file-associated area, and the file-associated area includes a first file. The electronic device 2500 further includes:

a fifth display unit 2570, configured to: in response to receiving an operation performed by the user on the first file, move the first file from the file-associated area to the exhibition area for display.

In this way, in this embodiment of this application, time of each agenda can be adjusted in real time, and a conference tempo can be effectively controlled.

The foregoing descriptions about implementations allow a person skilled in the art to clearly understand that, for the purpose of convenient and brief description, division of the foregoing function modules is used as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or a part contributing to a conventional technology, or all or some of the technical solutions may be implemented in the form of a software product. The software product is stored in a storage medium and includes several instructions for instructing an electronic device (which may be a single-chip microcomputer, a chip, or the like) or a processor (processor) to perform all or some of the operations of the methods described in embodiments of this application. The storage medium includes various media that can store program code, such as a USB flash drive, a removable hard disk, a read-only memory (read-only memory, ROM), a random access memory (random access memory, RAM), a magnetic disk, or an optical disc.

The foregoing descriptions are merely embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A conference creation method, wherein the method comprises:

displaying a first interface of a conferencing application to create a conference;

receiving first time of the conference that is input by a user in the first interface, and receiving an operation of creating the conference by the user;

displaying a second interface in response to receiving the operation of creating the conference by the user, wherein the second interface comprises a third control and an agenda arrangement list of the conference generated based on the first time of the conference and a preset agenda template, and the agenda arrangement list of the conference comprises at least one topic; and requesting, in response to receiving an operation performed by the user on the third control, a server to share the second interface with another device.

2. The method according to claim 1, wherein before the agenda arrangement list of the conference is generated based on the first time of the conference and the preset agenda template, the method further comprising:

receiving content of the conference that is input by the user in the first interface, wherein the agenda arrangement list of the conference is generated further based on the content of the conference, and a preset correspondence between content and an agenda template.

3. The method according to claim 1, wherein the second interface further comprises a first control, the method further comprising:

displaying a third interface in response to receiving an operation performed by the user on the first control, wherein the third interface comprises at least one second control and at least one agenda arrangement list, and each agenda arrangement list of the at least one agenda arrangement list corresponds to one second control of the at least one second control; and displaying, in the second interface in response to receiving an operation of selecting a target second control from the at least one second control by the user, an agenda arrangement list of the at least one agenda arrangement list corresponding to the target second control as the agenda arrangement list of the conference.

4. The method according to claim 1, wherein each time of each agenda in the agenda arrangement list of the conference is determined based on the first time of the conference, the preset agenda template, and a correspondence between a preset agenda template and a preset duration.

5. The method according to claim 1, wherein the first time comprises at least one of a conference start time, a conference end time, and a conference duration.

6. An electronic device, comprising:

a processor; and a memory coupled to the processor to store instructions, which when executed by the processor, cause the processor to:

display a first interface of a conferencing application to create a conference;

receive first time of the conference that is input by a user in the first interface, and receive an operation of creating the conference by the user;

display a second interface in response to receiving the operation of creating the conference by the user, wherein the second interface comprises a third control and an agenda arrangement list of the conference generated based on the first time of the conference and a preset agenda template, and the agenda arrangement list of the conference comprises at least one topic; and request, in response to receiving an operation performed by the user on the third control, a server to share the second interface with another device.

7. The electronic device according to claim 6, wherein the processor is further to:

receive content of the conference that is input by the user in the first interface, wherein the agenda arrangement list of the conference is generated further based on the content of the conference, and a preset correspondence between content and an agenda template.

8. The electronic device according to claim 6, wherein the second interface further comprises a first control, and wherein the processor is further to:

display a third interface in response to receiving an operation performed by the user on the first control, wherein the third interface comprises at least one second control and at least one agenda arrangement list, and each agenda arrangement list of the at least one agenda arrangement list corresponds to one second control of the at least one second control; and a fourth display unit, configured to display, in the second interface in response to receiving an operation of selecting a target second control from the at least one second control by the user, an agenda arrangement list of the at least one agenda arrangement list corresponding to the target second control as the agenda arrangement list of the conference.

9. The electronic device according to claim 6, wherein each time of each agenda in the agenda arrangement list of the conference is determined based on the first time of the conference, an agenda template of the preset agenda template, and a correspondence between a preset agenda template and a preset duration.

10. The electronic device according to claim 6, wherein the first time comprises at least one of a conference start time, a conference end time, and a conference duration.

11. A non-transitory computer-readable storage medium, wherein the computer-readable storage medium comprises computer instructions, and when the computer instructions are run on an electronic device, the electronic device is enabled to:

display a first interface of a conferencing application to create a conference;

receive first time of the conference that is input by a user in the first interface, and receive an operation of creating the conference by the user;

display a second interface in response to receiving the operation of creating the conference by the user, wherein the second interface comprises a third control and an agenda arrangement list of the conference generated based on the first time of the conference and a preset agenda template, and the agenda arrangement list of the conference comprises at least one topic; and request, in response to receiving an operation performed by the user on the third control, a server to share the second interface with another device.

12. The non-transitory computer-readable storage medium according to claim 11, wherein before the agenda arrangement list of the conference is generated based on the first time of the conference and the preset agenda template, the electronic device is enabled to:

receive content of the conference that is input by the user in the first interface, wherein the agenda arrangement list of the conference is generated further based on the content of the conference, and a preset correspondence between content and an agenda template.

13. The non-transitory computer-readable storage medium according to claim 11, wherein the second interface further comprises a first control, and wherein the electronic device is enabled to:

display a third interface in response to receiving an operation performed by the user on the first control, wherein the third interface comprises at least one second control and at least one agenda arrangement list, and each agenda arrangement list of the at least one agenda arrangement list corresponds to one second control of the at least one second control; and display, in the second interface in response to receiving an operation of selecting a target second control from the at least one second control by the user, an agenda arrangement list of the at least one agenda arrangement list corresponding to the target second control as the agenda arrangement list of the conference.

14. The non-transitory computer-readable storage medium according to claim 11, wherein each time of each agenda in the agenda arrangement list of the conference is determined based on the first time of the conference, the preset agenda template, and a correspondence between a preset agenda template and a preset duration.

15. The non-transitory computer-readable storage medium according to claim 11, wherein the first time comprises at least one of a conference start time, a conference end time, and a conference duration.

16. The method according to claim 1, wherein a user of the another device is enabled to modify the agenda arrangement list of the conference from the another device.

17. The method according to claim 1, wherein a user of the another device is enabled to trigger the conference to be created from the another device.

* * * * *